United States Patent
Kim et al.

(10) Patent No.: US 10,425,677 B2
(45) Date of Patent: Sep. 24, 2019

(54) MULTIMEDIA DEVICE CONNECTED TO AT LEAST ONE ELECTRONIC DEVICE AND CONTROLLING METHOD THEREOF

(71) Applicant: LG ELECTRONICS INC., Seoul (KR)

(72) Inventors: Geonwoo Kim, Pyeongtaek-si (KR); Keunryang Park, Pyeongtaek-si (KR); Seonil Yu, Pyeongtaek-si (KR); Kwangsoo Choi, Pyeongtaek-si (KR); Kwangseob Jeong, Pyeongtaek-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/210,128

(22) Filed: Jul. 14, 2016

(65) Prior Publication Data

US 2016/0323626 A1    Nov. 3, 2016

Related U.S. Application Data

(63) Continuation of application No. 13/835,618, filed on Mar. 15, 2013, now Pat. No. 9,432,608.

(30) Foreign Application Priority Data

Mar. 29, 2012  (KR) .................. 10-2012-0032372
Jan. 7, 2013   (KR) .................. 10-2013-0001412

(51) Int. Cl.
    *H04N 21/81*   (2011.01)
    *H04N 21/422*  (2011.01)
    (Continued)

(52) U.S. Cl.
    CPC ....... *H04N 21/42207* (2013.01); *G08C 17/02* (2013.01); *G08C 23/04* (2013.01);
    (Continued)

(58) Field of Classification Search
    CPC ....... H04N 21/42207; H04N 21/42218; H04N 21/42225
    See application file for complete search history.

(56) References Cited

U.S. PATENT DOCUMENTS 5,886,753 A   3/1999  Shinyagaito et al.
6,909,378 B1  6/2005  Lambrechts et al.
(Continued)

FOREIGN PATENT DOCUMENTS

CN   1913579   2/2007
CN   1968348   5/2007
(Continued)

OTHER PUBLICATIONS

Chinese Office Action issued in Application 201310109354.5 dated Apr. 12, 2017 (full Chinese text and full English translation).
(Continued)

*Primary Examiner* — Jeremy S Duffield
(74) *Attorney, Agent, or Firm* — KED & Associates LLP

(57) ABSTRACT

A multimedia device and controlling method thereof are disclosed, by which heterogeneous devices are controlled under at least two different communication protocols. The present invention includes displaying a guide message for controlling at least one function of the electronic device, receiving a remote control signal corresponding to a $1^{st}$ function among the at least one function from a $1^{st}$ remote controller of the electronic device, saving data for identifying the $1^{st}$ function and the received remote control signal in a memory by mapping the data and the received remote control signal to each other, displaying a graphic image including the data for identifying the $1^{st}$ function, if the data for identifying the $1^{st}$ function is selected by a $2^{nd}$ remote controller of the multimedia device, extracting the remote (Continued)

control signal mapped to the 1st function, and transmitting the extracted remote control signal to an external device.

10 Claims, 37 Drawing Sheets

(51) Int. Cl.
| | |
|---|---|
| *H04N 21/431* | (2011.01) |
| *H04N 21/485* | (2011.01) |
| *H04N 21/488* | (2011.01) |
| *H04N 5/44* | (2011.01) |
| *G08C 17/02* | (2006.01) |
| *G08C 23/04* | (2006.01) |
| *H04N 21/4728* | (2011.01) |

(52) U.S. Cl.
CPC ....... *H04N 5/4403* (2013.01); *H04N 21/4221* (2013.01); *H04N 21/42221* (2013.01); *H04N 21/42222* (2013.01); *H04N 21/42225* (2013.01); *H04N 21/42226* (2013.01); *H04N 21/431* (2013.01); *H04N 21/4728* (2013.01); *H04N 21/485* (2013.01); *H04N 21/4882* (2013.01); *H04N 21/8186* (2013.01); *G08C 2201/32* (2013.01); *H04N 2005/4426* (2013.01); *H04N 2005/4428* (2013.01); *H04N 2005/4435* (2013.01)

(56) References Cited

U.S. PATENT DOCUMENTS

| | | | | |
|---|---|---|---|---|
| RE39,059 E * | 4/2006 | Foster | ............... | G06F 3/04886 715/716 |
| 2002/0171624 A1* | 11/2002 | Stecyk | ............... | G06F 3/033 345/156 |
| 2006/0288370 A1 | 12/2006 | Rothschild | | |
| 2008/0166105 A1* | 7/2008 | Vanderhoff | ...... | H04N 21/42204 386/291 |
| 2009/0070696 A1 | 3/2009 | Belz et al. | | |
| 2009/0161027 A1 | 6/2009 | Hardacker et al. | | |
| 2009/0167555 A1* | 7/2009 | Kohanek | ......... | H04N 21/42218 340/3.1 |
| 2010/0134338 A1* | 6/2010 | Belz | ............... | H04N 21/42228 341/176 |
| 2010/0208145 A1* | 8/2010 | VanDuyn | ......... | H04N 21/42226 348/734 |
| 2010/0309389 A1* | 12/2010 | Hicks | ............... | H04N 21/43632 348/734 |
| 2011/0055865 A1 | 3/2011 | Jung | | |
| 2011/0061078 A1 | 3/2011 | Rothschild | | |
| 2011/0084867 A1* | 4/2011 | Friedlander | ...... | H04N 21/42207 341/176 |
| 2011/0102158 A1* | 5/2011 | Haughawout | ........ | H04N 21/485 340/12.29 |
| 2011/0109490 A1 | 5/2011 | Belz et al. | | |
| 2012/0320198 A1 | 12/2012 | Yasutake | | |
| 2013/0057765 A1 | 3/2013 | Zeleznikar | | |
| 2015/0103249 A1 | 4/2015 | Jung | | |

FOREIGN PATENT DOCUMENTS

| | | |
|---|---|---|
| CN | 101271619 | 9/2008 |
| CN | 101365076 | 2/2009 |
| CN | 201577141 | 9/2010 |
| CN | 102291546 | 12/2011 |
| EP | 1 898 637 A2 | 3/2008 |
| EP | 2 262 227 A1 | 12/2010 |
| JP | 2008-066899 | 3/2008 |
| KR | 10-2006-0010073 | 2/2006 |
| KR | 10-2010-0075257 | 7/2010 |
| KR | 10-2010-0081186 | 7/2010 |
| KR | 10-2012-0070866 | 7/2012 |
| KR | 2012-0070868 | 7/2012 |
| WO | WO 2010/019382 A1 | 2/2010 |

OTHER PUBLICATIONS

European Search Report dated Jun. 18, 2013 issued in Application No. 13 00 1437.

European Office Action dated Jun. 12, 2015 issued in Application No. 13001437.6.

Anonymous: "Harmony Tips and Tricks: What to Do if Your Device is Not in the Harmony Database—Logitech BlogLogitech Blog", Sep. 22, 2010 (Sep. 22, 2010), XP055191596.

U.S. Office Action dated Sep. 17, 2015 issued in U.S. Appl. No. 13/835,618.

U.S. Notice of Allowance for parent U.S. Appl. No. 13/835,618 dated Apr. 22, 2016.

European Search Report for Application 16001204.3 dated Jul. 22, 2016.

European Office Action dated Sep. 12, 2017 issued in Application No. 16001204.3.

Anonymous: "SRP5107 / 27 user manual," Nov. 30, 2011 (Nov. 30, 2011), XP055402493.

European Summons to Attend Oral Proceedings pursuant to Rule 115(1) EPC dated Mar. 12, 2018 issued in Application No. 16001204. 3.

Korean Notice of Allowance dated Sep. 18, 2018 issued in Application No. 10-2012-0032372 (with English Translation).

Korean Notice of Allowance dated Jun. 1, 2019 issued in Application 10-2013-0001412 (English translation and full Korean text).

\* cited by examiner

MULTIMEDIA DEVICE CONNECTED TO AT LEAST ONE ELECTRONIC DEVICE AND CONTROLLING METHOD THEREOF

CROSS-REFERENCE TO RELATED APPLICATIONS

This application is a Continuation Application of prior U.S. patent application Ser. No. 13/835,618 filed Mar. 15, 2013, which claims priority under 35 U.S.C. § 119 to Korean Patent Application Nos. 10-2012-0032372, filed on Mar. 29, 2012, and 10-2013-0001412, filed on Jan. 7, 2013, whose entire disclosures are hereby incorporated by reference.

BACKGROUND OF THE INVENTION

Field of the Invention

The present invention relates to a remote controller and multimedia device, and more particularly, to a multimedia device connected to at least one electronic device and controlling method thereof.

Discussion of the Related Art

Generally, the ongoing developments of the electronic technology enable various kinds of electronic devise to be devised and released. The recently released electronic devices tend to be configured with a function of receiving remote control signals in consideration of user's convenience. Thus, a user is able to control such an electronic device as a TV, an audio player, a DVD player, an air conditioner, an electronic fan and the like using a remote controller.

Meanwhile, a recently developed multimedia device (e.g., TV, etc.) is equipped with a function of receiving various kinds of informations in a manner of being connected to an internet network. In order to control a multimedia device and an electronic device (e.g., STB, BD player, PC, etc.) connected to the multimedia device, it causes a problem that remote controls are necessary as many as the number of the devices.

Although many discussions on the technology in controlling a plurality of devices using a single remote controller have been made, they mostly have a problem in putting restriction on using a single communication protocol. And, it is impossible for a single remote controller to store all IR codes. Moreover, it is difficult to implement such a remote controller due to the limited memory capacity.

SUMMARY OF THE INVENTION

Accordingly, the present invention is directed to a multimedia device connected to at least one electronic device and controlling method thereof that substantially obviate one or more problems due to limitations and disadvantages of the related art.

One object of the present invention is to provide a hybrid remote controller, by which heterogeneous devices can be controlled under 2 different communication protocols.

Another object of the present invention is to provide a solution, by which heterogeneous devices can be controlled using a minimized capacity of a memory of a remote controller.

A further object of the present invention is to provide a technology, in which information on a device needs not to be inputted by a user manually and directly in order to control devices of various types using a single universal remote controller.

Moreover, an object of a $2^{nd}$ embodiment of the present invention is to provide a solution, which enables a user to arbitrarily edit a virtual remote controller and by which a specific function of a specific device absent from a database can be controlled using a single remote controller.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a multimedia device, which is connected to at least one electronic device, according to one embodiment of the present invention may include the steps of displaying a guide message for controlling at least one function of the at least one electronic device, receiving a remote control signal corresponding to a $1^{st}$ function among the at least one function from a $1^{st}$ remote controller of the at least one electronic device, saving a data for identifying the $1^{st}$ function and the received remote control signal in a memory by mapping the data and the received remote control signal to each other, displaying a graphic image including the data for identifying the $1^{st}$ function, if the data for identifying the $1^{st}$ function is selected by a $2^{nd}$ remote controller of the multimedia device, extracting the remote control signal mapped to the $1^{st}$ function, and transmitting the extracted remote control signal to an external device.

In another aspect of the present invention, a multimedia device, which is connected to at least one electronic device, according to one embodiment of the present invention may include a display module configured to display a guide message for controlling at least one function of the at least one electronic device, a receiving module configured to receive a remote control signal corresponding to a $1^{st}$ function among the at least one function from a $1^{st}$ remote controller of the at least one electronic device, a memory configured to store a data for identifying the $1^{st}$ function and the received remote control signal by mapping the data and the received remote control signal to each other, a generating module configured to generate a graphic image including the data for identifying the $1^{st}$ function, a detecting module configured to extract the remote control signal mapped to the $1^{st}$ function if the data for identifying the $1^{st}$ function is selected by a $2^{nd}$ remote controller of the multimedia device, and a transmitting module configured to transmit the extracted remote control signal to an external device.

Accordingly, the present invention provides the following effects and/or features.

First of all, according to one embodiment of the present invention, a hybrid remote controller is provided to control heterogeneous devices under 2 different communication protocols.

Secondly, according to another embodiment of the present invention, a solution is provided to control heterogeneous devices using a minimized capacity of a memory of a remote controller.

Thirdly, according to a further embodiment of the present invention, it is unnecessary for a user to input information on a device manually and directly in order to control devices of various types using a single universal remote controller.

Fourthly, according to a $2^{nd}$ embodiment of the present invention, a solution is provided, thereby enabling a user to arbitrarily edit a virtual remote controller and to control a specific function of a specific device absent from a database using a single remote controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
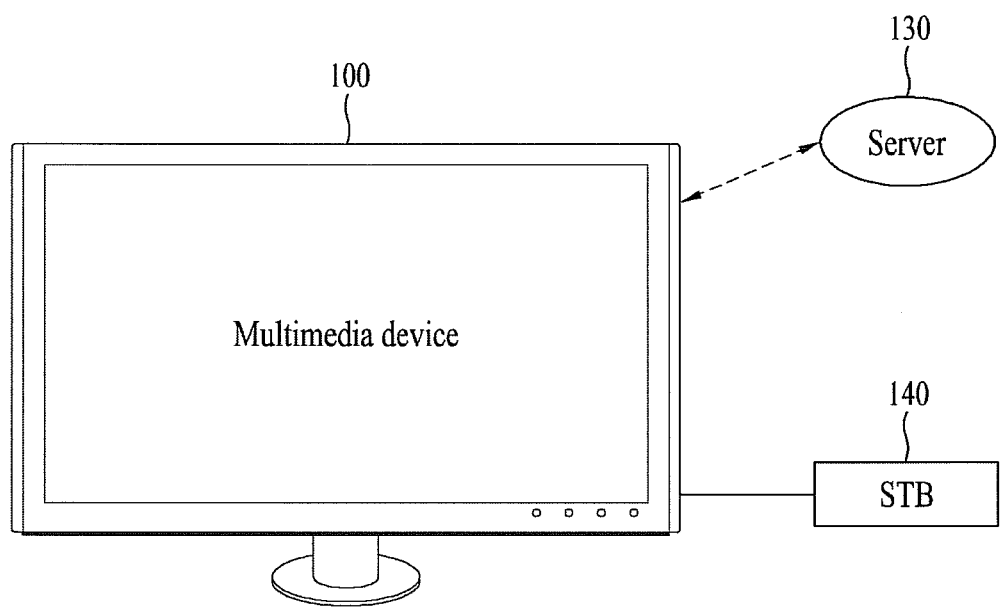
FIG. 1 is a schematic diagram of a system including a multimedia device, a remote controller, a server and at least one electronic device according to one embodiment of the present invention.
Figure 1:
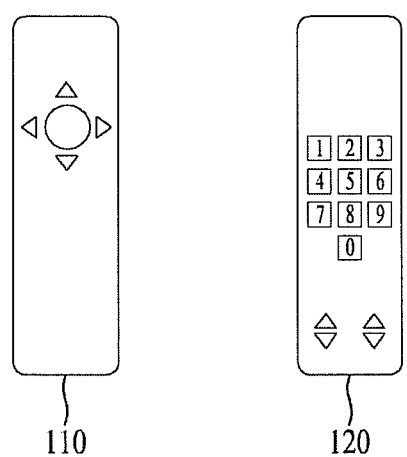

Reference will now be made in detail to the preferred embodiments of the present invention, examples of which are illustrated in the accompanying drawings. Wherever possible, the same reference numbers will be used throughout the drawings to refer to the same or like parts.

The suffixes 'module' and 'unit' for components used in the following description are given in consideration of facilitating the preparation of the present specification. And, the 'module' and the 'unit' may be used interchangeably.

Meanwhile, a multimedia device described in the present specification includes an intelligent electronic device having a computer supportive function added to a broadcast receiving function for example. As an internet function and the like are further added to the multimedia device having a broadcast receiving function of high fidelity, the multimedia device may be provided with such a convenient interface as a handwriting input device, a touchscreen, a touchpad, a spatial remote controller and the like. Moreover, the multimedia device accesses an internet and computer owing to the support of a wire/wireless internet function and is then able to perform such a function as an email, a web browsing, a banking, a game and the like. To this end, an universal OS standardized for the various functions is available.

Thus, since various applications can be freely added to or deleted from a universal OS kernel for example, a multimedia device mentioned in the description of the present invention may be able to perform various kinds of user-friendly functions. In particular, the multimedia device may include one of an internet TV, an IPTV, a network TV, an HBBTV, a smart TV, an open hybrid TV (PHTV) and the like. Moreover, the multimedia device may be applicable to such a device as a smart phone, a PC, a home appliance and the like if necessary.

Although reference will now be made in detail to the preferred embodiments of the present invention, examples of which are illustrated in the accompanying drawings, the present invention may be non-limited by the preferred embodiments of the present invention.

Terminologies used in the present specification are selected from general terminologies used currently and widely in consideration of functions in the present invention. Yet, the terminologies may be changeable in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Besides, although a remote controller and a remocon are used interchangeably for facilitation of the description in the present specification, it is apparent that the remote controller and the remocon should be construed as the same meaning unless exceptional situations.

FIG. 1 is a schematic diagram of a system including a multimedia device, a remote controller, a server and at least one electronic device according to one embodiment of the present invention.

Referring to FIG. 1, according to a related art, one remote controller 120 is necessary for an STB 140. And, another remote controller 110 is necessary for a multimedia device 100. Moreover, owing to the technical development of the multimedia device 100, wire/wireless communications with an external server 130 are possible and various function are provided. Yet, a remote controller 120 for the STB 140 provides extremely limited functions only.

Therefore, according to one embodiment of the present invention, a solution for controlling the STB 140 and other electronic devices using the remote controller 110 for the multimedia device 100 by replacing the remote controller 120 for the STB 140 is provided.

For instance, the multimedia device 100 builds a database of IR code values of electronic devices (STB 140 included) controlled by the remote controller. In particular, it is designed to enable the IR code values to be frequently updated by accessing the server 130.

Moreover, the remote controller 110 according to one embodiment of the present invention is designed to enable both IR communication and RF communication and may further include a location detection sensor, which shall be described later in the present specification.

In particular, the multimedia device 100 according to one embodiment of the present invention builds a database of IR code values of at least one or more electronic devices for the communication with the server 130. Therefore, in case that a specific electronic device to be controlled via the universal remote controller 110 is confirmed, it may be possible to output an OSD, on which at least one or more functions of the specific electronic device are listed, by accessing the database.

In case that a specific region is selected in a manner of shifting the universal remote controller 110, a corresponding IR code value is transmitted to the universal remote controller 110 and is also forwarded to the corresponding STB 140. Hence, it is advantageous in that the remote controller 120 of the STB 140 is unnecessary to use.

Yet, since a user needs to be aware of information on a company or manufacturer of the STB 140 and the like in advance, it may be disadvantageous in aspect of a data processing speed. A solution for this disadvantage shall be described in detail with reference to FIGS. 6 to 13 later.

In brief, the multimedia device 100 periodically updates the IR code values for controlling the electronic devices from the server 130 connected via the internet network or the like. Of course, if there a request made by a user, an embodiment of updating IR code values comes within the scope of the appended claims and their equivalents.

Meanwhile, assume that the remote controller 110 and the multimedia device 100 transceive data with each other via a $1^{st}$ communication means (e.g., Bluetooth, etc.). if the remote controller 110 makes a request for an IR code value for a specific function of a specific electronic device to the multimedia device 100, the multimedia device 100 searches a previously stored database (DB) for a corresponding IR code value and then transmits the found IR code value to the remote controller 110.

Subsequently, the remote controller 110 forwards the IR code value received from the multimedia device 100 to the corresponding electronic device 140 via a $2^{nd}$ communication means (e.g., IR communication, etc.). In particular, the remote controller 110 according to one embodiment of the present invention is designed to play a role as a relay, thereby bringing a technical effect that a large-size memory needs not to be used.

Figure 2:
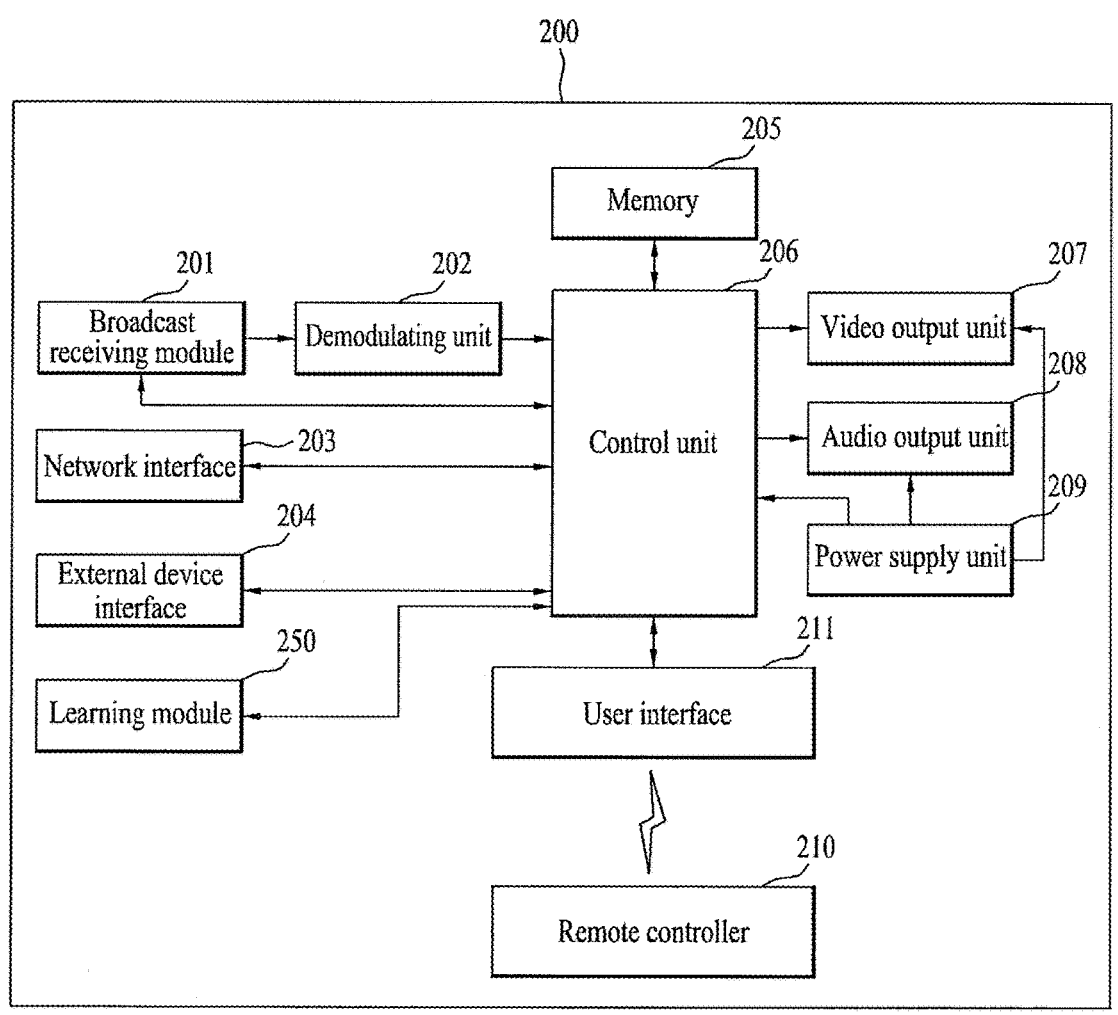
FIG. 2 is a detailed block diagram of components of a multimedia device according to one embodiment of the present invention.

FIG. 2 is a detailed block diagram of components of a multimedia device according to one embodiment of the present invention. With reference to the former description of the multimedia device 100 shown in FIG. 1, it may be possible to supplementarily analyze a multimedia device 200 shown in FIG. 2.

Referring to FIG. 2, a multimedia device 200 according to one embodiment of the present invention may include a broadcast receiving module 201, a demodulating unit 202, a network interface 203, an external device interface 204, a memory 205, a control unit 206, a video output unit 207, an audio output unit 208, a power supply unit 209, a user interface 211 and the like. Meanwhile, the multimedia device 200 may be configured to perform data communication with a remote controller 210. And, the remote controller 210 shall be described in detail with reference to FIG. 4 and FIG. 5 later.

The broadcast receiving module 201 may be designed as an RF tuner for example. Alternatively, the broadcast receiving module 201 may be designed as an interface configured to receive broadcast data from such an external device as STB and the like.

The broadcast receiving module 201 may be able to receive an RF broadcast signal of a single carrier in accordance with ATSC (advanced television system committee) or an RF broadcast signal of multiple carriers in accordance with DVB (digital video broadcasting) for example.

The demodulating unit 202 receives a digital IF signal (DIF) transformed by the broadcast receiving module 201 and then performs a demodulating operation thereon.

For instance, if the digital IF signal outputted by the broadcast receiving module 201 follows ATSC, the demodulating unit may perform 8-VSB (8-vestigial side band) demodulation for example. Moreover, the demodulating unit 202 may be able to perform channel decoding.

The external device interface 204 includes the interface configured to enable data communication between an external device and the multimedia device 200. The external device interface 204 may be connected by wire/wireless to such an external device as a DVD (digital versatile disk), a Blu-ray, a game device, a camera, a camcorder, a computer (e.g., laptop, etc.), an STB and the like. The external device interface 204 delivers a video, an audio and/or a data signal, which is externally inputted from the connected external device, to the control unit 206. And, the external device interface 204 may be able to output a video, an audio and/or a data signal, which is processed by the control unit 206, to the external device.

The external device interface 204 may include at least one of a USB terminal, a CVBS (composite video banking sync) terminal, a component terminal, an S-video terminal (analog), a DVI (digital visual interface) terminal, an HDMI (high definition multimedia interface) terminal, an RGB terminal, a D-SUB terminal and the like for example.

The network interface 203 provides an interface configured to connect the multimedia device 200 to a wire/wireless network including an internet network. The network interface 203 may include an Ethernet terminal and the like for an access to a wire network for example. For an access to a wireless network, the network interface 203 may use such a communication protocol as WLAN (wireless LAN: Wi-Fi), Wibro (wireless broadband), Wimax (world interoperability for microwave access), HSPDA (high speed downlink packet access) and the like.

The network interface 203 may be able to transceive data with another user or another electronic device via the accessed network or another network linked to the accessed network.

The memory 205 may be able to store programs for signal processing and control within the control unit 206. The memory 205 may store a signal processed audio, video or data signal. The memory 205 may perform a function for temporary storage of an audio, video or data signal inputted from the external device interface 204 or the network interface 203. And, the memory 205 may store various operating systems, middleware and platforms for example.

The user interface 211 forwards a signal inputted by a user to the control unit 206. The user interface 211 transmits a signal from the control unit 206 to an external device (e.g., the remote controller 210). For instance, the user interface 211 is designed to receive and process a control signal for power-on/off, channel selection, screen settings or the like from the remote controller 210 by such a communication as RF (radio frequency) communication, infrared (IR) communication and the like. And, the user interface 211 is designed to transmit a control signal from the control unit 206 to the remote controller 210.

The control unit 206 may be able to generate and output a signal for a video or audio output in a manner of demultiplexing a stream inputted via the broadcast receiving module 201, the demodulating unit 202, the network interface 203 or the external device interface 204 or processing demultiplexed signals. The control unit 206 shall be described in detail with reference to FIG. 3 later.

The video output unit 207 generates a drive signal by converting a video signal, a data signal or an OSD signal, which is processed by the control unit 206, or a video signal, a data signal or the like, which is received from the external device interface 204, to R/G/B signal. And, the video output unit 207 may include such a display as a PDP, an LCD, an OLED, a flexible display, a 3D (3-dimensional) display and the like.

The audio output unit 208 outputs an audio by receiving an input of stereo signal, 3.1-channel signal or 5.1-channel signal, which is audio-processed by the control unit 206, for example. And, the audio output unit 208 may be implemented with speakers of various types.

The power supply unit 209 supplies power to the multimedia device 200 overall. In particular, the power supply unit 209 may be able to supply the power to the control unit 206 implemented into an SOC (system on chip) type, the video output unit 207 for the image display, and the audio output unit 208 for the audio output.

Particularly, the embodiment of the present invention is described as follows.

First of all, the network interface 203 accesses a specific server under the control of the control unit 206. IR code values received from the specific server may be designed to be saved in the memory 205. In this case, the IR code values are the values required for controlling the electronic devices connected via the external device interface 204.

Finally, the IR code value corresponding to a specific function of a specific electronic device may be transmitted to the remote controller 210 via the user interface 211 in response to a request made by the remote controller 210. In doing so, as mentioned in the foregoing description, it may be able to adopt the Bluetooth communication.

The multimedia device 200 according to one embodiment of the present invention further includes a learning module 250. Particularly, the learning module 250 performs a function of automatically identifying an electronic device by analyzing an IR signal received from a remote controller of the electronic device (e.g., STB, etc.) to control. A detailed IR signal analyzing method shall be described with reference to FIGS. 6 to 13 later.

The user interface unit 211 receives a remote control signal from a $1^{st}$ remote controller of an external electronic device (e.g., STB, etc.). In this case, the user interface unit 211 may be named a receiving module.

The learning module 250 analyzes the received remote control signal and then determines a type of the electronic device in accordance with a result of the analysis. In this case, the control unit 206 may be named a determining module.

The video output unit 207 displays graphic data for identifying at least one function provided by the determined electronic device. In this case, the video output unit 207 may be named a display module.

Moreover, if a specific function is selected by a $2^{nd}$ remote controller of the multimedia device 200, the control unit 206 may control a code value corresponding to the selected specific function to be transmitted to the $2^{nd}$ remote controller.

The receiving module may be designed to receive an infrared (IR) signal from the $1^{st}$ remote controller (e.g., an external device STB remote controller) for example.

The determining module estimates an electronic device becoming a control target of the $1^{st}$ remote controller with reference to at least one of a frequency value of the received IR signal, a length value of a lead code, a length value of unit bits, and a data structure (i.e., configuration of frame).

The display module may be designed to display a message for guiding a selection of a specific push button attached to the $1^{st}$ remote controller before displaying the graphic data.

If it is determined that a plurality of electronic devices corresponding to the analysis result exist, the display module may be designed to display a lit including ID for identifying each of a plurality of the electronic devices.

The memory 205 includes a database that stores a code value corresponding to a specific function per type of the electronic device. The control unit 206 accesses the external server and then controls the database to be updated by predetermined periods.

Figure 3:
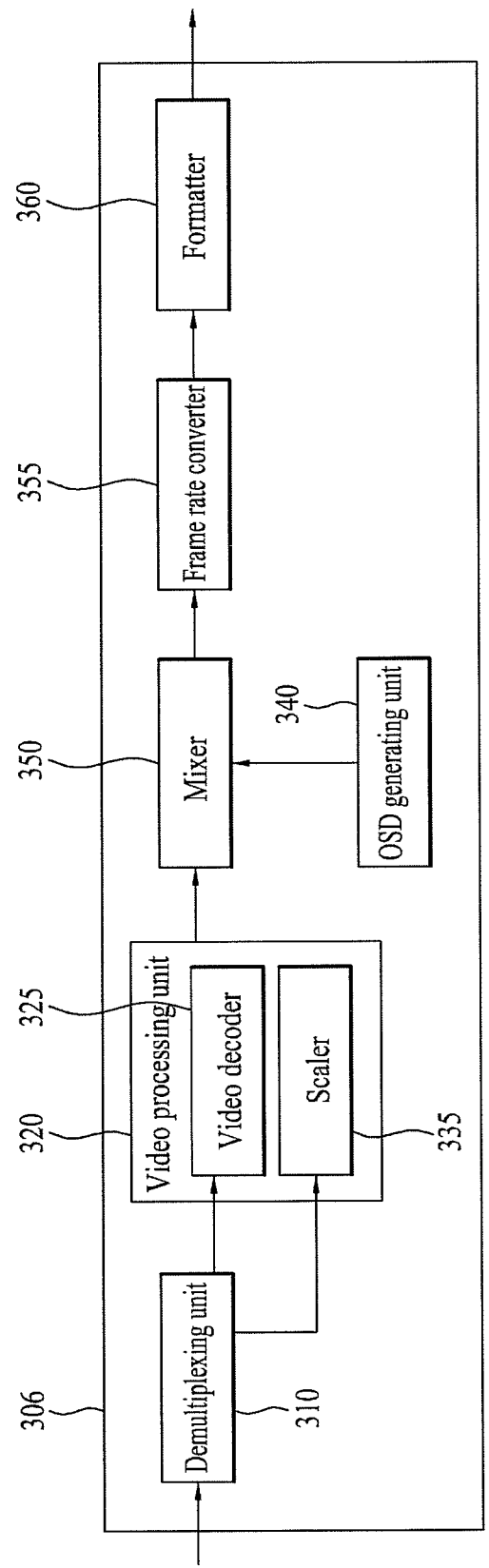
FIG. 3 is a detailed block diagram of a control unit shown in FIG. 2.

FIG. 3 is a detailed block diagram of the control unit shown in FIG. 2.

Referring to FIG. 3, a control unit 306 of a multimedia device may include a demultiplexing unit 310, a video processing unit 320, an OSD generating unit 340, a mixer 350, a frame rate converting unit 355, a formatter 360 and the like. And, the control unit 306 may be designed to further include an audio processing unit (not shown in the drawing) and a data processing unit (not shown in the drawing), which may come within the scope of the appended claims and their equivalents.

The demultiplexing unit 310 may demultiplex an inputted stream. For instance, if MPEG-2 TS is inputted, the demultiplexing unit 310 may be able to demultiplex the inputted TS into a video signal, an audio signal and a data signal.

The video processing unit 320 may be able to perform a video processing of a demultiplexed video signal. To this end, the video processing unit 320 may include a video decoder 325 and a scaler 335. The video decoder 325 decodes the demultiplexed video signal and the scaler 335 performs a scaling to enable resolution of the decoded video signal to be outputtable from the video output unit. And, the video signal decoded by the video processing unit 320 is inputted to the mixer 350.

The OSD generating unit 340 generates an OSD signal in response to a user input or by itself. Hence, the mixer 350 is able to mix the OSD signal generated from the OSD generating unit 340 and the decoded video signal video-processed by the video processing unit 320 with each other.

The mixed signal is provided to the formatter 360. Since a decoded broadcast video signal or an external input signal and an OSD signal are mixed together, an OSD may be displayed in a manner of being overlaid on a broadcast video or an external input video.

The frame rate converter (FRC) 355 may be able to convert a frame rate of an inputted video. For instance, the frame rate converter 355 converts a frame rate to 120 or 240 Hz from 60 Hz.

The formatter 360 receives an input of an output signal of the frame rate converter 355 and then outputs the signal by changing a format of the signal to be suitable for the video output unit. For instance, the formatter 360 may be able to output R/G/B data signal. In this case, the R/G/B data signal may be outputted as low voltage differential signaling (LVDS) or mini-LVDS.

Particularly, the embodiment of the present invention is described as follows.

First of all, an OSD for selecting an electronic device and function to be controlled by a remote controller according to one embodiment of the present invention is generated by the aforementioned OSD generating unit 340. In order to overlay the OSD on a normal broadcast screen, the aforementioned mixer 350 is further designed.

Figure 4:
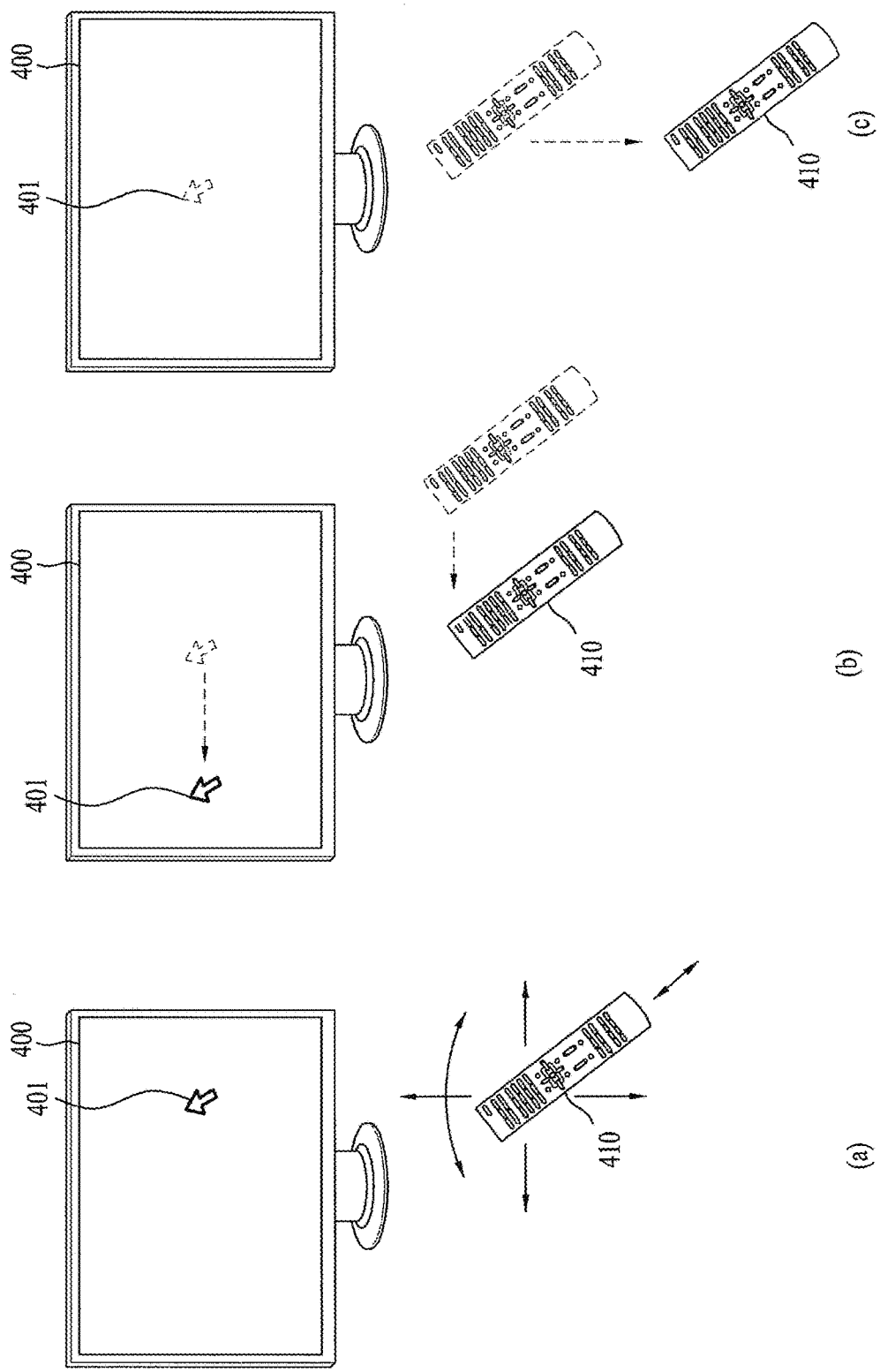
FIG. 4 is a schematic diagram of an exterior of a remote controller according to one embodiment of the present invention.

FIG. 4 is a schematic diagram of an exterior of a remote controller according to one embodiment of the present invention.

Referring to FIG. 4 (a), on a screen of a multimedia device 400, a pointer 401 corresponding to a motion of a remote controller 410 is displayed. A user may move the remote controller 410 in right and left directions [FIG. 4 (b)], in top and bottom directions [FIG. 4 (c)] or may rotate the remote controller 410. Since the corresponding pointer 401 is displayed in a manner of moving in response to a motion in 3D space, such a remote controller 410 may be named a spatial remote controller.

Referring to FIG. 4 (b), if a user moves the remote controller 410 in left direction, the pointer 401 displayed on the screen of the multimedia device 400 may move to the left. Meanwhile, if the motion of the remote controller 410 is detected via a sensor of the remote controller 410, information on the detected motion of the remote controller 410 may be transmitted to the multimedia device 400. Subsequently, the multimedia device 400 may be able to calculate coordinates of the pointer 401 from the information on the motion of the remote controller 410. And, the multimedia device 400 may be able to display the pointer 401 to correspond to the calculated coordinates.

On the other hand, referring to FIG. 4 (c), if a user moves the remote controller 410 in bottom direction, the pointer 401 displayed on the screen of the multimedia device 400 moves in bottom direction as well.

Therefore, using the remote controller 410 according to one embodiment of the present invention, it is possible to quickly select a specific region within the screen of the multimedia device 400.

Figure 5:
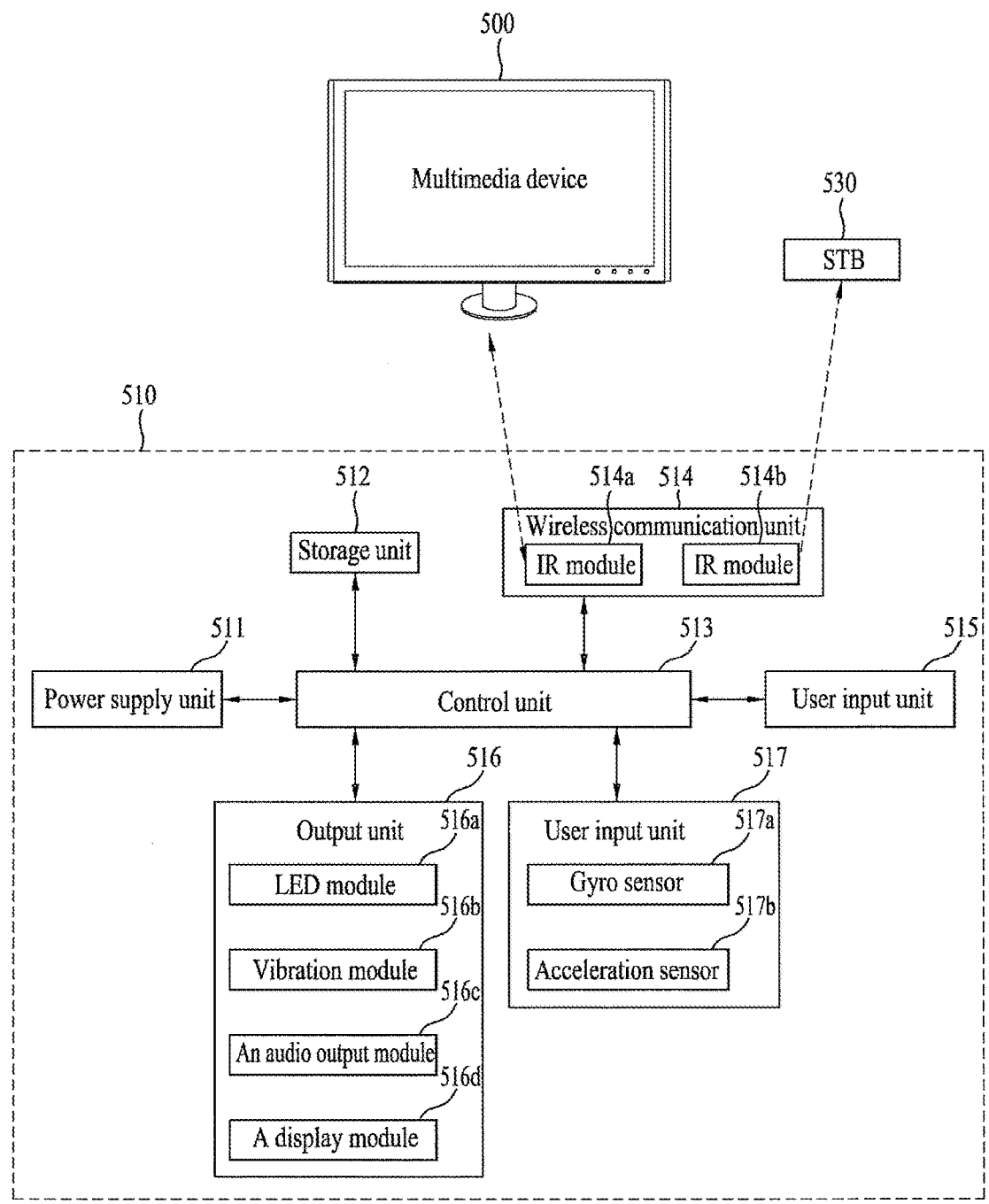
FIG. 5 is a detailed block diagram of components of the remote controller shown in FIG. 4.

FIG. 5 is a detailed block diagram of components of the remote controller shown in FIG. 4.

Referring to FIG. 5, a remote controller 510 may include a wireless communication unit 514, a user input unit 517, an output unit 516, a power supply unit 511, a storage unit 512, a control unit 513 and the like.

The wireless communication unit 514 may be designed to enable communication with a random external device. Particularly, according to one embodiment of the present invention, an RF module 514a may be designed to enable communication with the multimedia device 500 and an IR module 514b may be designed to enable IR communication with an external electronic device 530 (e.g., STB).

Therefore, it may be able to implement the remote controller 510 to play a role as a relay in forwarding an IR code value received from the multimedia device 500 to the STB 530.

Moreover, according to one embodiment of the present invention, the remote controller 510 may transmit a signal containing information on a motion of the remote controller 510 and the like to the multimedia device 500 via the RF module 514a.

And, the remote controller 510 may be able to receive a signal transmitted by the multimedia device 500 via the RF module 514a as well. Moreover, the remote controller 510 may be able to transmit a command for a power-on/off, a channel switching, a volume adjustment or the like to the multimedia device 500 via the IR module 514b if necessary.

The user input unit 515 may include at least one of a keypad, a button, a touchpad, a touchscreen and the like.

The sensor unit 517 may include at least one of a gyro sensor 515a and an acceleration sensor 517b. In particular, the gyro sensor 517a may be able to sense information on a motion of the remote controller 510. For instance, the gyro sensor 517a may be able to sense the information on the motion of the remote controller 510 with reference to axes x, y and z. The acceleration sensor 517b may be able to sense information on a moving speed of the remote controller 510 and the like. Meanwhile, the sensor unit 517 may further include a distance measuring sensor. And, it may be able to sense a distance from the multimedia device 500 using the distance measuring sensor.

The output unit 516 may be able to output a video or audio signal corresponding to a manipulation of the user input unit 515 or a video or audio signal corresponding to a signal transmitted by the multimedia device 500. For instance, the output unit 516 may include at least one of an LED module 516a configured to be turned on in case of manipulating the user input unit 515 or transceiving a signal with the multimedia device 500 via the wireless communication unit 514, a vibrating module 516b configured to generate vibration, an audio output module 516c configured to output an audio, and a display module 516d configured to output a video.

The power supply unit 511 may supply power to each of the components of the remote controller 510. If the remote controller 510 does not move for prescribed duration, the power supply unit 511 stops a power supply, thereby reducing power consumption.

The storage unit 512 may be configured to store various kinds of programs required for controlling or operating the remote controller 510, application data and the like. The control unit 513 controls overall items related to the control of the remote controller 510. For instance, the control unit 513 may be able to transmit a signal corresponding to a prescribed key manipulation of the user input unit 515 or a signal corresponding to the motion of the remote controller 510 sensed by the sensor unit 517 to the multimedia device 500 or the STB 530 via the wireless communication unit 514.

Figure 6:
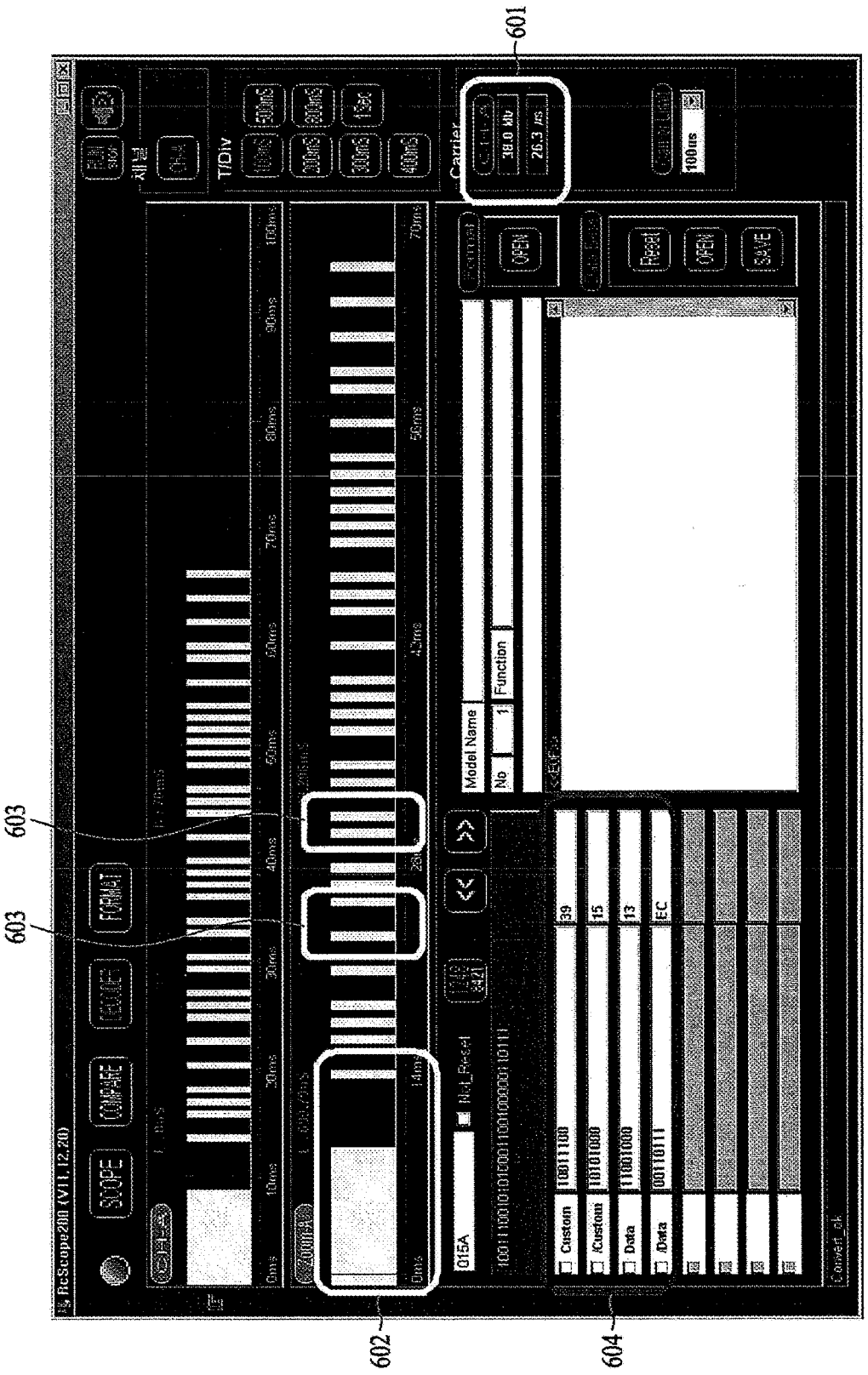
FIG. 6 is a diagram of data of analyzed data of an IR signal of a random remote controller according to one embodiment of the present invention.

FIG. 6 is a diagram of data of analyzed data of an IR signal of a random remote controller according to one embodiment of the present invention. In the following description, a method for the learning module shown in FIG. 2 to analyze an initially received IR signal of a remote controller of an external electronic device shall be explained. If so, it brings a technical effect of identifying a type or manufacturer of the external electronic device based on the IR signal analysis.

A result value of sampling an IR signal of a remote controller configured to control a $1^{st}$ STB connected to a multimedia device is shown in FIG. 6 according to a test of the present invention. Based on this test result, it may be able to identify the $1^{st}$ STB. Using the result value shown in FIG. 6, it may be able to analyze a frequency 601 of the IR signal, a length 602 of a lead code value, a unit bit length value 603, a data structure 604 and the like. A detailed method shall be described with reference to FIGS. 7 to 9. In particular, the lead code value means a code that indicates a start of remote control data and may be called a leader code value.

Figure 7:
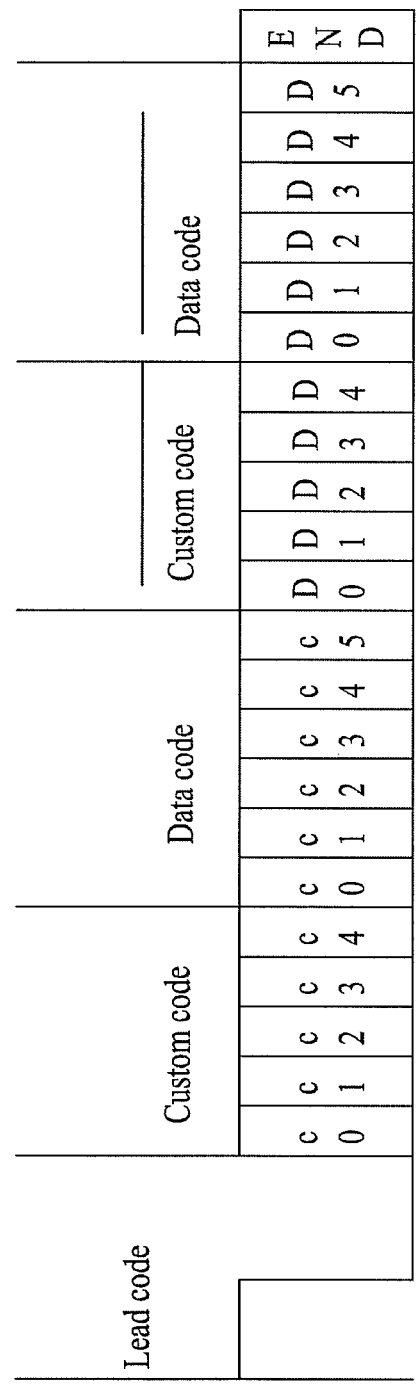
FIG. 7 is a diagram of a full frame structure of the IR signal shown in FIG. 6.

FIG. 7 is a diagram of a full frame structure of the IR signal shown in FIG. 6.

Referring to FIG. 7, an IR signal of a $1^{st}$ STB remote controller may be configured with a lead code, a custom code and a data code. Yet, since each manufacturer has a unique custom code structure and a unique data code structure, it may be able to identify the $1^{st}$ STB using the unique code structures. For instance, comparing FIG. 7 and FIG. 11 to each other, it may be able to confirm the unique identification information.

Figure 8:
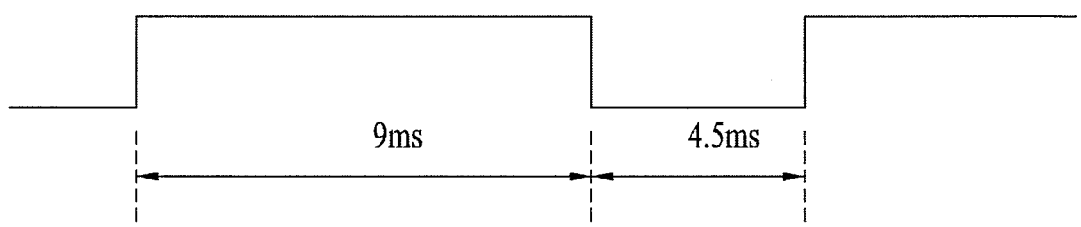
FIG. 8 is a diagram of a lead code value of the IR signal shown in FIG. 6.

FIG. 8 is a diagram of a lead code value of the IR signal shown in FIG. 6.

Referring to FIG. 8, a lead code value in an IR signal of a $1^{st}$ STB remote controller includes total 13.5 ms, a length of an on-case includes total 9 ms, and a length of an off-case includes total 4.5 ms. Comparing FIG. 8 and FIG. 12 to each other, it may be able to confirm the unique identification information for identifying each electronic device (e.g., STB).

Figure 9:
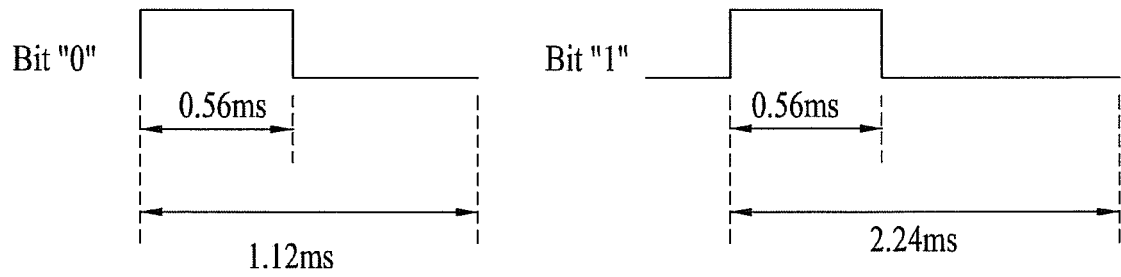
FIG. 9 is a diagram of a unit bit length value of the IR signal shown in FIG. 6.

FIG. 9 is a diagram of a unit bit length value of the IR signal shown in FIG. 6.

Referring to FIG. 9, unit bits in an IR signal of a $1^{st}$ STB remote controller include 0 and 1, each of which has a different length. Comparing FIG. 9 and FIG. 13 to each other, it may be able to confirm the unique identification information for identifying each electronic device (e.g., STB).

Figure 10:
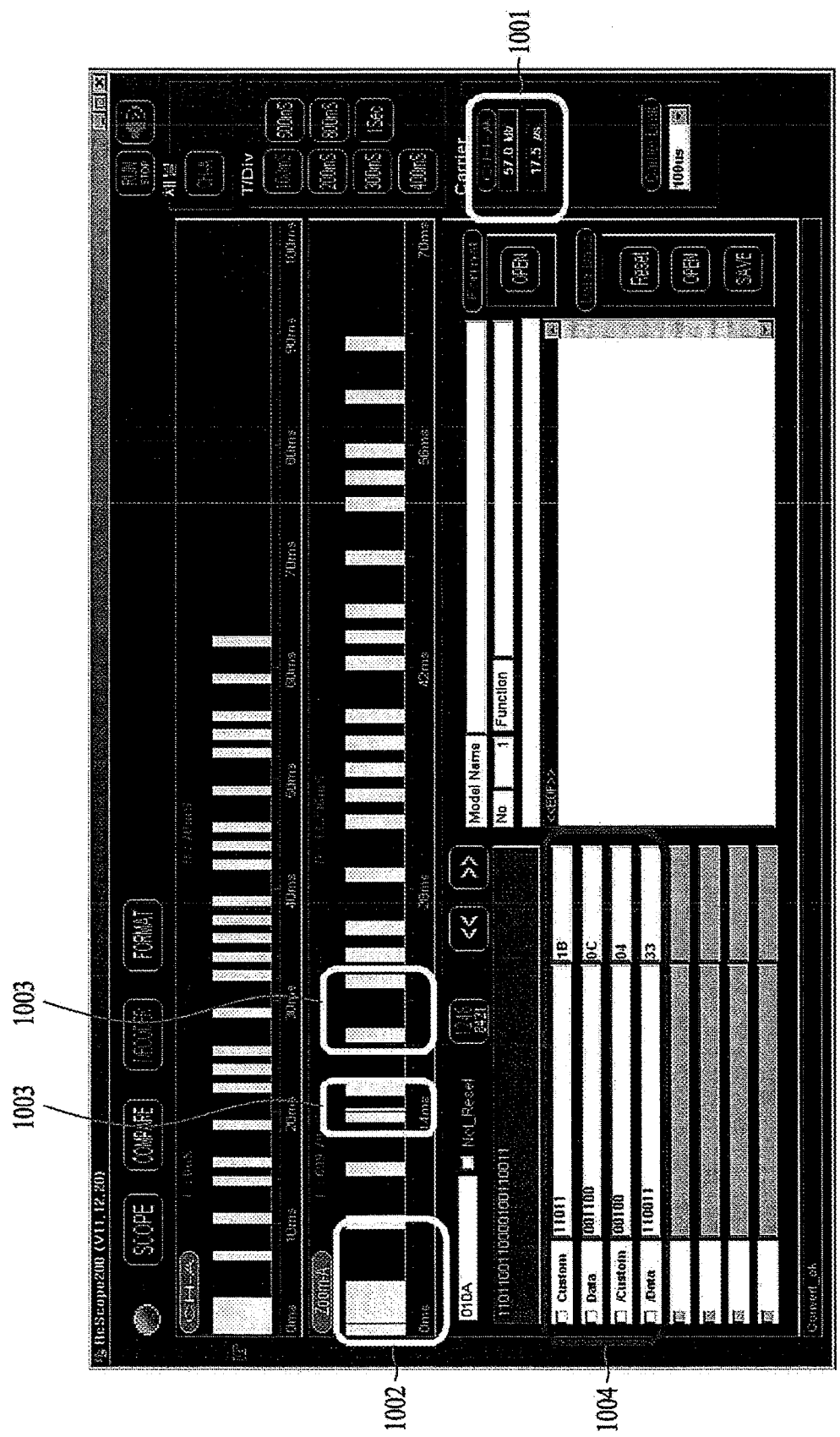
FIG. 10 is a diagram of data of analyzed data of another IR signal of a random remote controller according to one embodiment of the present invention.

FIG. 10 is a diagram of data of analyzed data of another IR signal of a random remote controller according to one embodiment of the present invention. In the following description, a method for the learning module shown in FIG. 2 to analyze an initially received IR signal of a remote controller of an external electronic device shall be explained. If so, it brings a technical effect of identifying a type or manufacturer of the external electronic device based on the IR signal analysis.

A result value of sampling an IR signal of a remote controller configured to control a $2^{nd}$ STB connected to a multimedia device is shown in FIG. 10 according to a test of the present invention. Based on this test result, it may be able to identify the $2^{nd}$ STB. Using the result value shown in FIG. 10, it may be able to analyze a frequency 1001 of the IR signal, a length 1002 of a lead code value, a unit bit length value 1003, a data structure 1004 and the like. A detailed method shall be described with reference to FIGS. 11 to 13.

Figure 11:
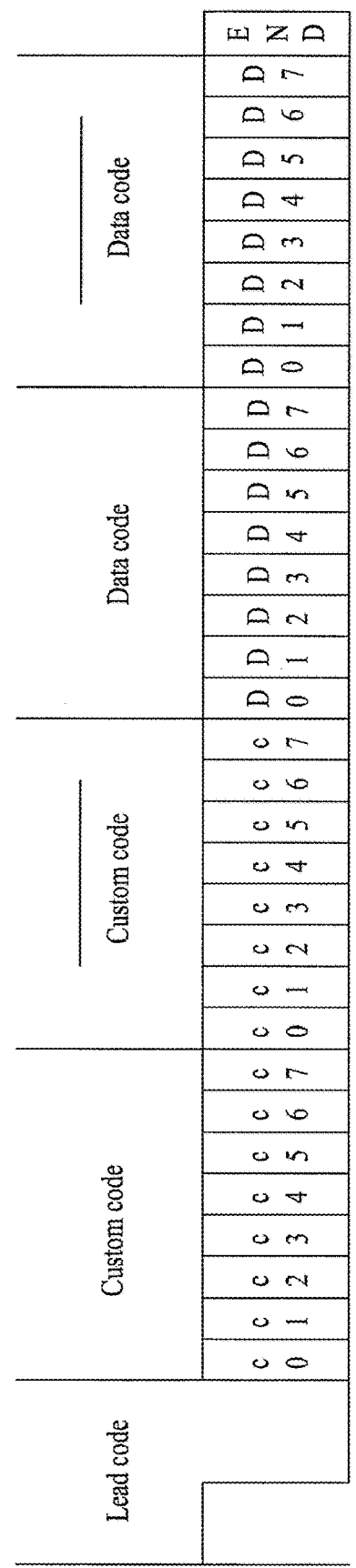
FIG. 11 is a diagram of a full frame structure of the IR signal shown in FIG. 10.

FIG. 11 is a diagram of a full frame structure of the IR signal shown in FIG. 10.

Referring to FIG. 11, an IR signal of a $2^{nd}$ STB remote controller may be configured with a lead code, a custom code and a data code. Yet, since each manufacturer has a unique custom code structure and a unique data code structure, it may be able to identify the $2^{nd}$ STB using the unique code structures. For instance, comparing FIG. 11 and FIG. 7 to each other, it may be able to confirm the unique identification information.

Figure 12:
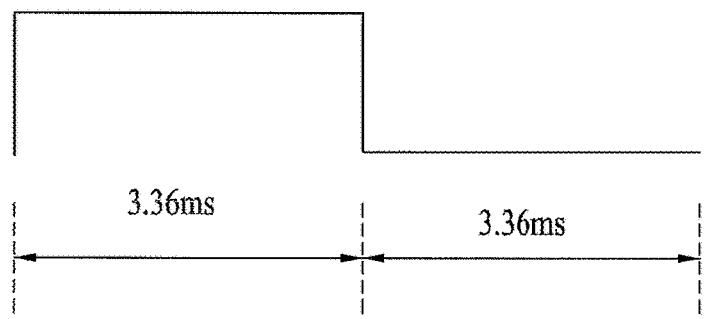
FIG. 12 is a diagram of a lead code value of the IR signal shown in FIG. 10.

FIG. 12 is a diagram of a lead code value of the IR signal shown in FIG. 10.

Referring to FIG. 12, a lead code value in an IR signal of a $2^{nd}$ STB remote controller includes total 6.72 ms, a length of an on-case includes total 3.36 ms, and a length of an off-case includes total 3.36 ms. Comparing FIG. 12 and FIG. 8 to each other, it may be able to confirm the unique identification information for identifying each electronic device (e.g., STB).

Figure 13:
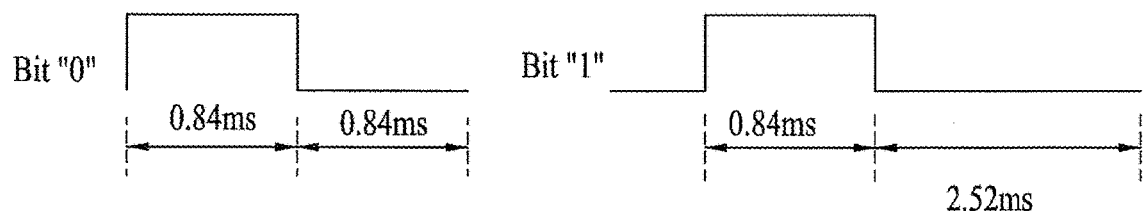
FIG. 13 is a diagram of a unit bit length value of the IR signal shown in FIG. 10.

FIG. 13 is a diagram of a unit bit length value of the IR signal shown in FIG. 10.

Referring to FIG. 13, unit bits in an IR signal of a $2^{nd}$ STB remote controller include 0 and 1, each of which has a different length. Comparing FIG. 13 and FIG. 9 to each other, it may be able to confirm the unique identification information for identifying each electronic device (e.g., STB).

Referring to FIGS. 6 to 13 mentioned in the above description, it is advantageous in that a multimedia device is able to automatically identify a connected STB if a user presses a random push button attached to a remote controller of the STB once only. Moreover, if an IR code value corresponding to a remote controller of an identified STB is designed to be built as a database in advance, it is able to completely control the STB using a remote controller of a multimedia device instead of a remote controller of the STB. In particular, it is unnecessary for a user to manually memorize information on a manufacturer of STB and information on a cable service provider.

Figure 14:
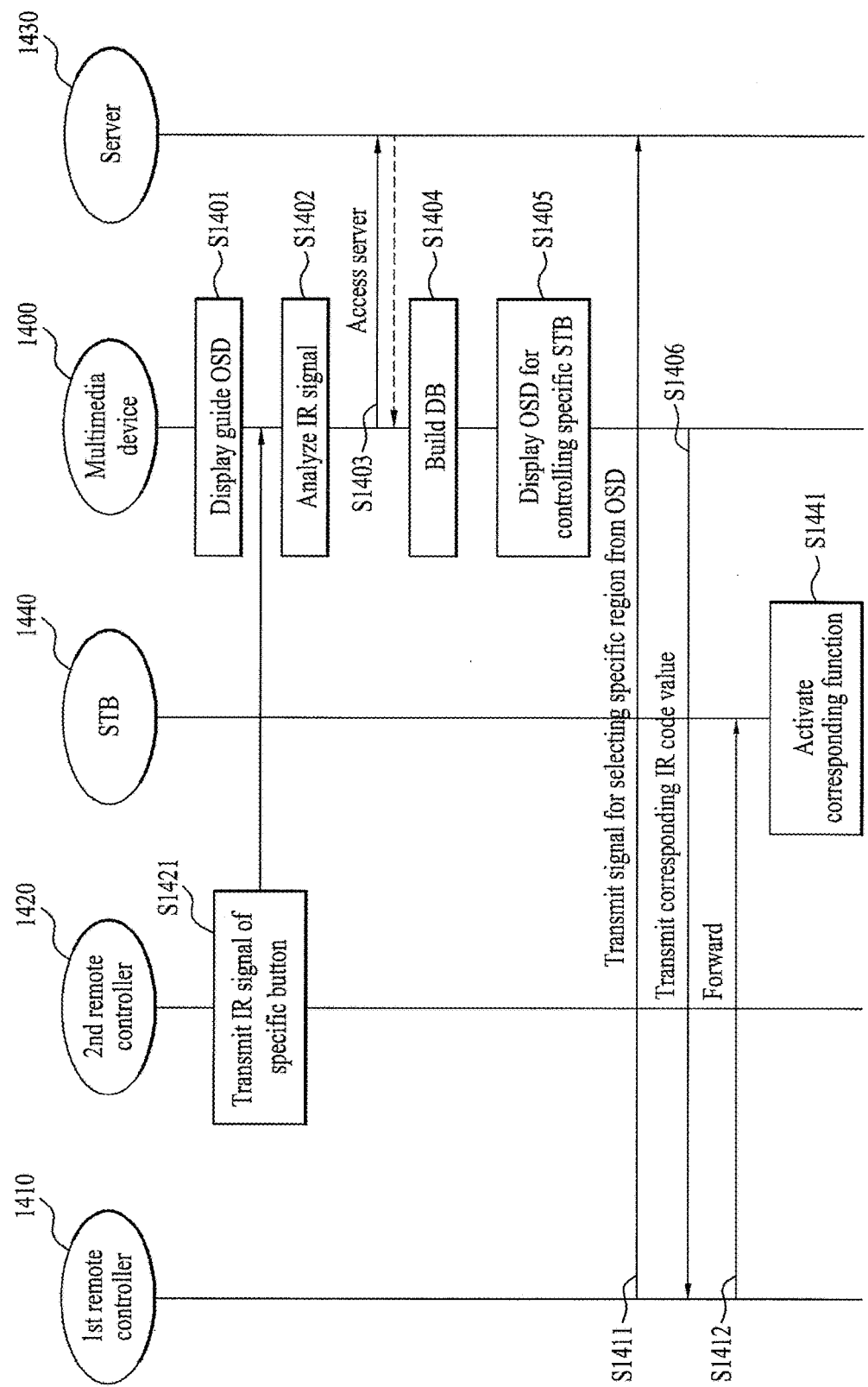
FIG. 14 is a detailed flowchart of data flows among a multimedia device, a server, an STB and a plurality of remote controllers according to one embodiment of the present invention.

FIG. 14 is a detailed flowchart of data flows among a multimedia device, a server, an STB and a plurality of remote controllers according to one embodiment of the present invention. In the following description, a process for controlling all electronic devices with a universal remote controller using a multimedia device according to one embodiment of the present invention is explained with reference to FIG. 14.

First of all, a multimedia device 1400 according to one embodiment of the present invention displays a message for guiding an input of a specific push button of a connected STB 1440 in order to start an initial IR signal running process [S1401]. For instance, the specific push button may include such a button, which is attached to a remote controller of almost every electronic device (e.g., STB, etc.), as a power related button, a channel related button, a volume related button and the like.

In doing so, a user presses a specific button of a $2^{nd}$ remote controller 1420, whereby a corresponding IR signal is transmitted to the multimedia device 1400 [S1421]. Hence, the multimedia device 1400 is able to confirm a manufacturer of the corresponding remote controller by analyzing the received IR signal [S1402].

Meanwhile, the multimedia device 1400 accesses a server 1430 [S1403] and builds a database of IR code values corresponding to the remote controller of the identified STB [S1404].

Alternatively, although FIG. 14 shows one example that the step S1403 and the step S1404 are performed after the step S1402, it may be able to design the step S1403 and the S1404 to be periodically performed irrespective of the step S1402, which comes within the scope of the appended claims and their equivalents.

Owing to the steps mentioned in the above description, the multimedia device 1400, which has identified the type of the connected STB 1440, displays an OSD for listing at least one or more functions of the STB 1440 [S1405]. Therefore, it is advantageous in that the user is able to activate all functions of the STB 1440 using the $1^{st}$ remote controller 1410, which is the remote controller of the multimedia device 1400, instead of the 2nd remote controller 1420.

In response to a motion of the $1^{st}$ remote controller 1410, assume that a specific region is selected from the OSD displayed in the step S1405 [S1411]. In this case, the multimedia device 1400 accesses the database built in the step S1404 and then transmits a corresponding IR code value to the $1^{st}$ remote controller 1410 again [S1406].

The $1^{st}$ remote controller 1410 forwards the received IR code value to the STB 1440 [S1412]. The STB 1440 is then able to activate the corresponding function [S1441]. A detailed embodiment of the implementation shall be described with reference to FIG. 20 later.

Meanwhile, a method of controlling the multimedia device 1400 according to one embodiment of the present invention is described in detail with reference to FIG. 14 as follows.

First of all, the multimedia device 1400 receives a remote control signal from the remote controller 1420 of the electronic device 1440 and then analyzes the received remote control signal. The multimedia device 1400 is designed to determine a type of the electronic device 1440 in accordance with a result of the analysis and to display graphic data for identifying at least one function provided by the determined electronic device 1440 by accessing a memory.

In this case, the memory includes a database storing a code value corresponding to a specific function per type of the electronic device 1440.

According to another embodiment of the present invention, if a specific function is selected by the remote controller 1410 of the multimedia device 1400, a code value corresponding to the selected specific function is transmitted to the remote controller 1410. In this case, the step S1421 is designed to receive an infrared (IR) signal from the remote controller 1420.

As mentioned in the foregoing description with reference to FIGS. 6 to 13, it is able to estimate an electronic device, which becomes a control target of the $1^{st}$ remote controller, with reference to at least one of a frequency value of the received IR signal, a length value of a lead code, a length value of unit bit and a data structure (configuration of frame).

Figure 15:
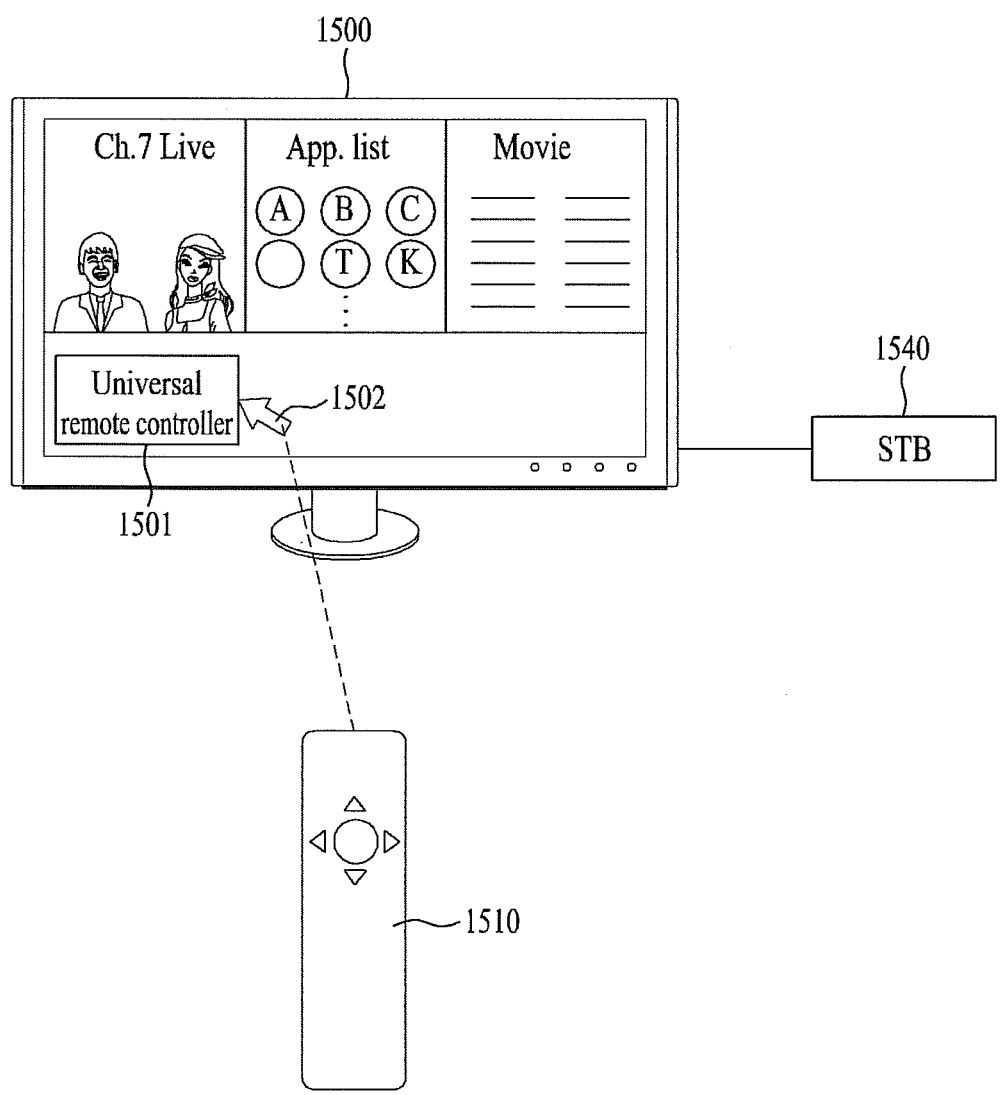
FIG. 15 is a diagram of a process for initially setting a universal remote controller using a multimedia device according to one embodiment of the present invention.

FIG. 15 is a diagram of a process for initially setting a universal remote controller using a multimedia device according to one embodiment of the present invention. In the following description, an initial process for setting a universal remote controller is explained with reference to FIG. 15.

Referring to FIG. 15, a multimedia device 1500 according to one embodiment of the present invention displays a broadcast screen, a downloaded application list, a viewable movie list and the like on a screen. Meanwhile, assume that the multimedia device 1500 is connected to an external STB 1540.

According to a related art, since an STB is controlled using a remote controller dedicated to the external STB 1540 only, it is difficult for a user to use a remote controller 1510 for controlling the multimedia device 1500.

Particularly, since the ongoing technological development enables the multimedia device 1500 to perform a networking of IP or the like unlike the conventional television, the multimedia device 1500 provides more functions than ever. Therefore, it is considerably inconvenient for a user to use an STB dedicated remote controller and a multimedia device dedicated remote controller separately. And, it is not preferable in aspect of data processing speed.

Thus, if a user intends to control the STB 1540 using the remote controller 1510 of the multimedia device 1500, the user places an indicator 1502, of which location moves in response to a motion of the remote controller 1510, on a specific option region 1501.

If the specific option region 1501 is selected, the setting for controlling the STB 1540 using the remote controller 1510 of the multimedia device 1500 is initiated. In particular, according to the feature of the present invention, it is unnecessary for the user to separately memorize identification information on the STB 1540.

Figure 16:
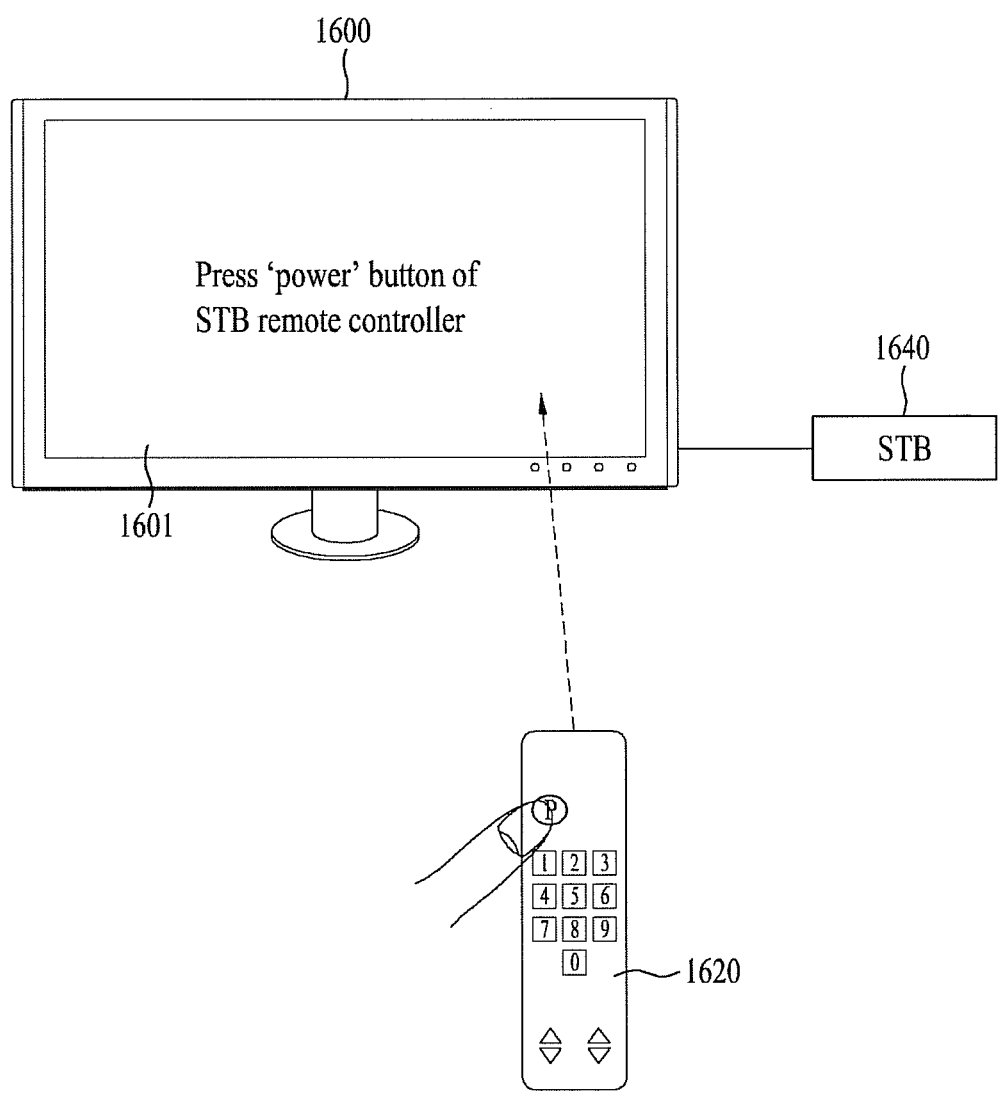
FIG. 16 and FIG. 17 are diagrams of a process for learning an IR signal of an external STB remote controller using a multimedia device according to one embodiment of the present invention.
Figure 17:
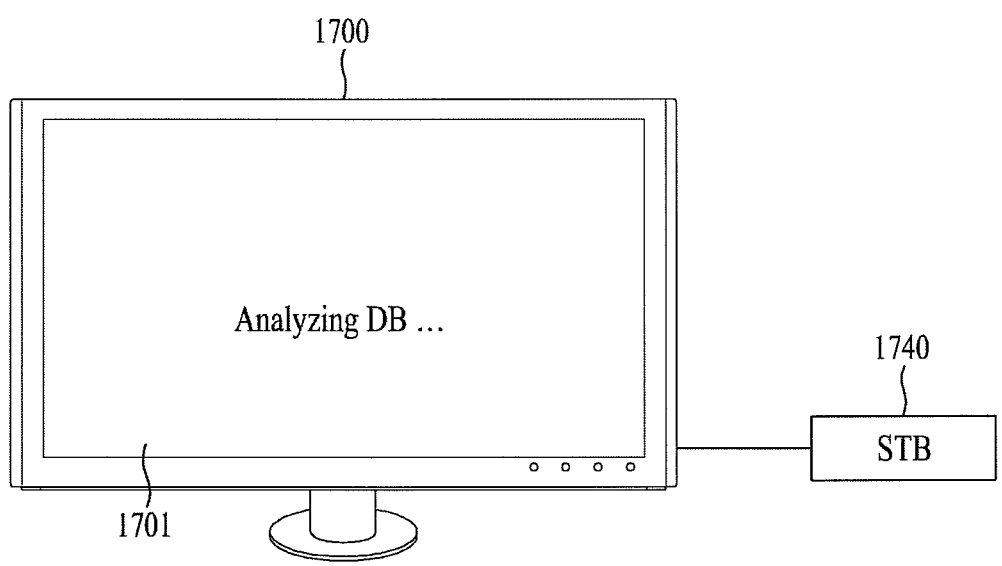

FIG. 16 and FIG. 17 are diagrams of a process for learning an IR signal of an external STB remote controller using a multimedia device according to one embodiment of the present invention. On the assumption of the former description with reference to FIG. 15, a process for learning an IR signal of an STB is described with reference to FIG. 16 and FIG. 17 as follows.

Referring to FIG. 16, a multimedia device 1600 according to one embodiment of the present invention is connected to an external STB 1640 by wire or wireless. Moreover, the multimedia device 1600 displays a guide message 1601 for selecting a random button (e.g., a power button) attached to an STB remote controller.

In doing so, it is enough for a user to simply press a power button attached to a remote controller 1620 of the STB 1640.

Therefore, it is able to solve the problem caused to the user in selecting one of tens or hundreds of STB manufacturers or cable service providers or inputting a corresponding STB manufacturer or cable service provider.

Accordingly, referring to FIG. 17, a multimedia device 1700 according to one embodiment of the present invention displays a message 1701 indicating that a database is being analyzed.

By the learning process described with reference to FIGS. 6 to 13, it may be able to detect information on a type of a connected STB 1740. Although it is a matter of course that a detailed manufacturer or type of an STB can be designed to be detected, if an STB is specified enough to bring an IR code value for each function provided by the STB, it may come within the scope of the appended claims and their equivalents.

Meanwhile, although a detailed numerical value is not represented in FIG. 17, a user may be provided with detailed information by representing a time or extent rate taken to analyze DB as a numerical value, which comes within the scope of the appended claims and their equivalents.

Figure 18:
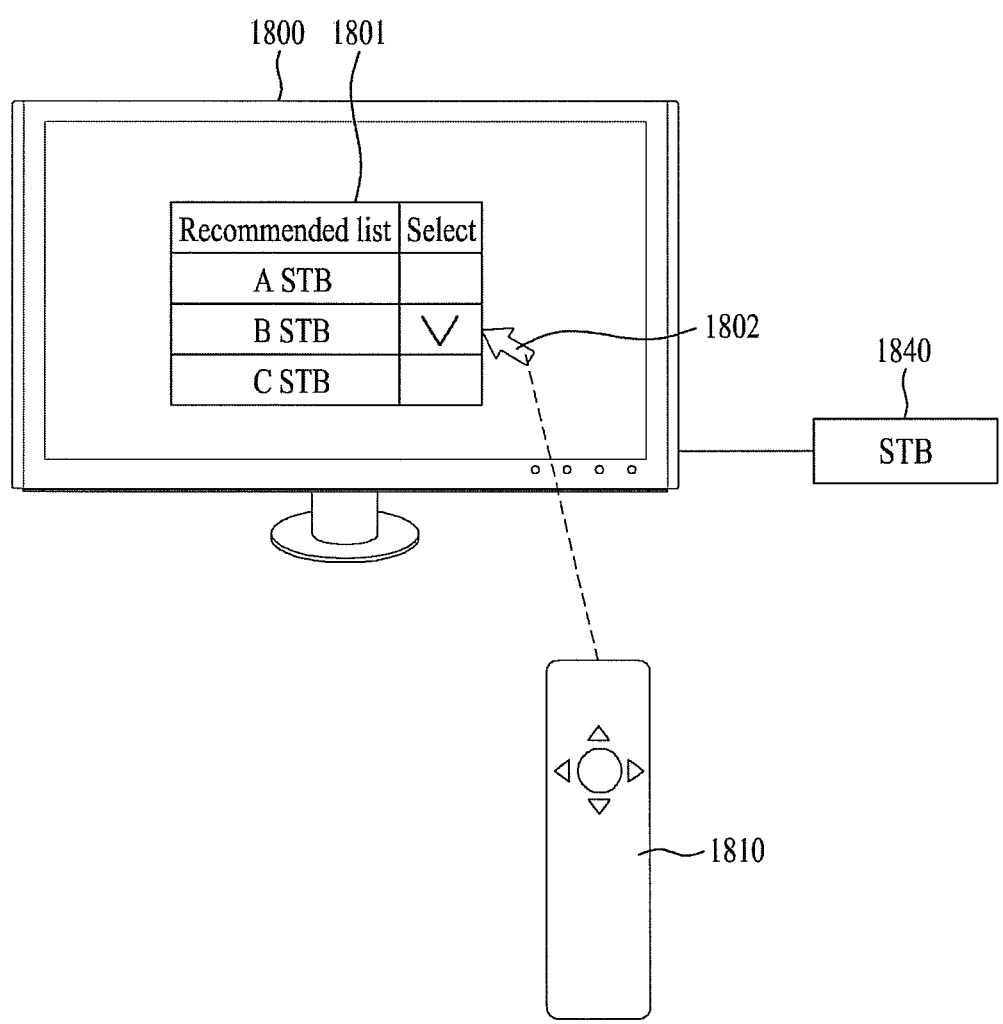
FIG. 18 is a diagram of a multimedia device configured to providing a recommended list if a plurality of related STBs exist.

FIG. 18 is a diagram of a multimedia device configured to providing a recommended list if a plurality of related STBs exist. On the assumption of the description with reference to FIG. 17, a solution for a case of a presence of a plurality of STBs corresponding to a result of an IR signal analysis is described with reference to FIG. 18 as follows.

An IR code value may be available in a manner of being defined differently for each STB manufacturer. Yet, in some cases, IR code values may overlap with each other. In this case, if a multimedia device automatically confirms a random STB, an unexpected error may be possibly generated.

To solve this problem, referring to FIG. 18, a multimedia device 1800 according to one embodiment of the present invention may be able to display a recommended list 1801 if the multimedia device 1800 is unable to specify a connected STB 1840 with a DB analysis only or a plurality of STBs, each of which uses the same IR code value, exist.

In doing so, a user selects an option 1802 of selecting a currently connected STB 1840 by checking a manufacturer of the STB 1840 and the like. For instance, the user is able to select the option 1802 by moving a remote controller 1810 mapped to the multimedia device 1800.

Figure 19:
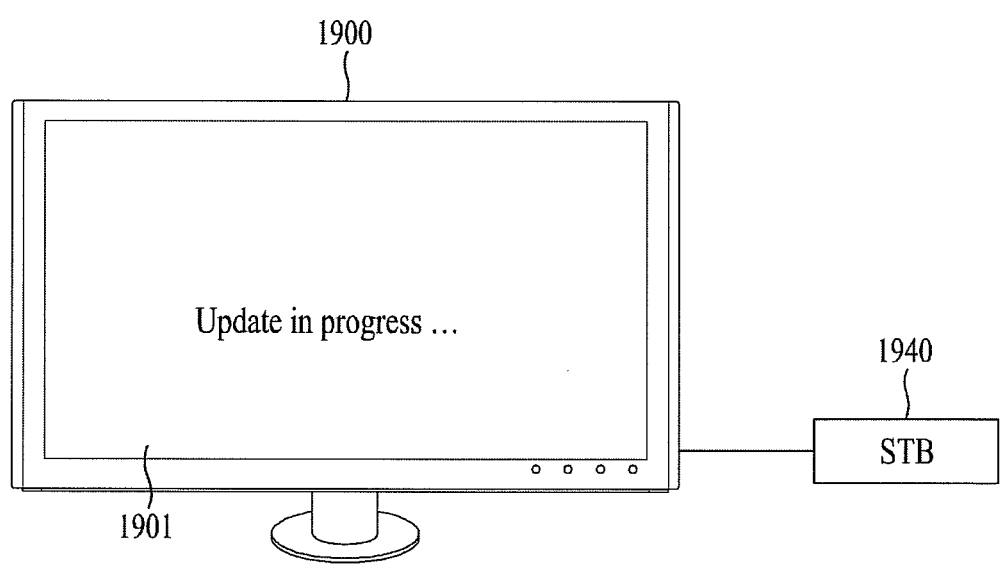
FIG. 19 is a diagram of a multimedia device configured to updating a database if a related STB does not exist.

FIG. 19 is a diagram of a multimedia device configured to updating a database if a related STB does not exist. On the assumption of the description with reference to FIG. 17, a solution for a case of a non-presence of STB corresponding to a result of an IR signal analysis is described with reference to FIG. 19 as follows.

First of all, it is possible for new STB manufacturers to appear frequently instead of major STB manufacturers. And, it is also possible for an STB manufacturer to change or add an IR code value if necessary.

In particular, if an IR code value of an STB 1940 connected to a multimedia device 1900 by the IR signal learning process shown in FIGS. 6 to 13 does not exist in a database, the multimedia device 1900 is designed to access a server.

In this case, the server is designed to store and update IR code values corresponding to remote controllers of various electronic devices including an STB for example.

Hence, the multimedia device 1900 is able to automatically update the IR code value of the new STB 1940 and may output an information 1901 indicating that an additional time is necessary, as shown in FIG. 19.

Figure 20:
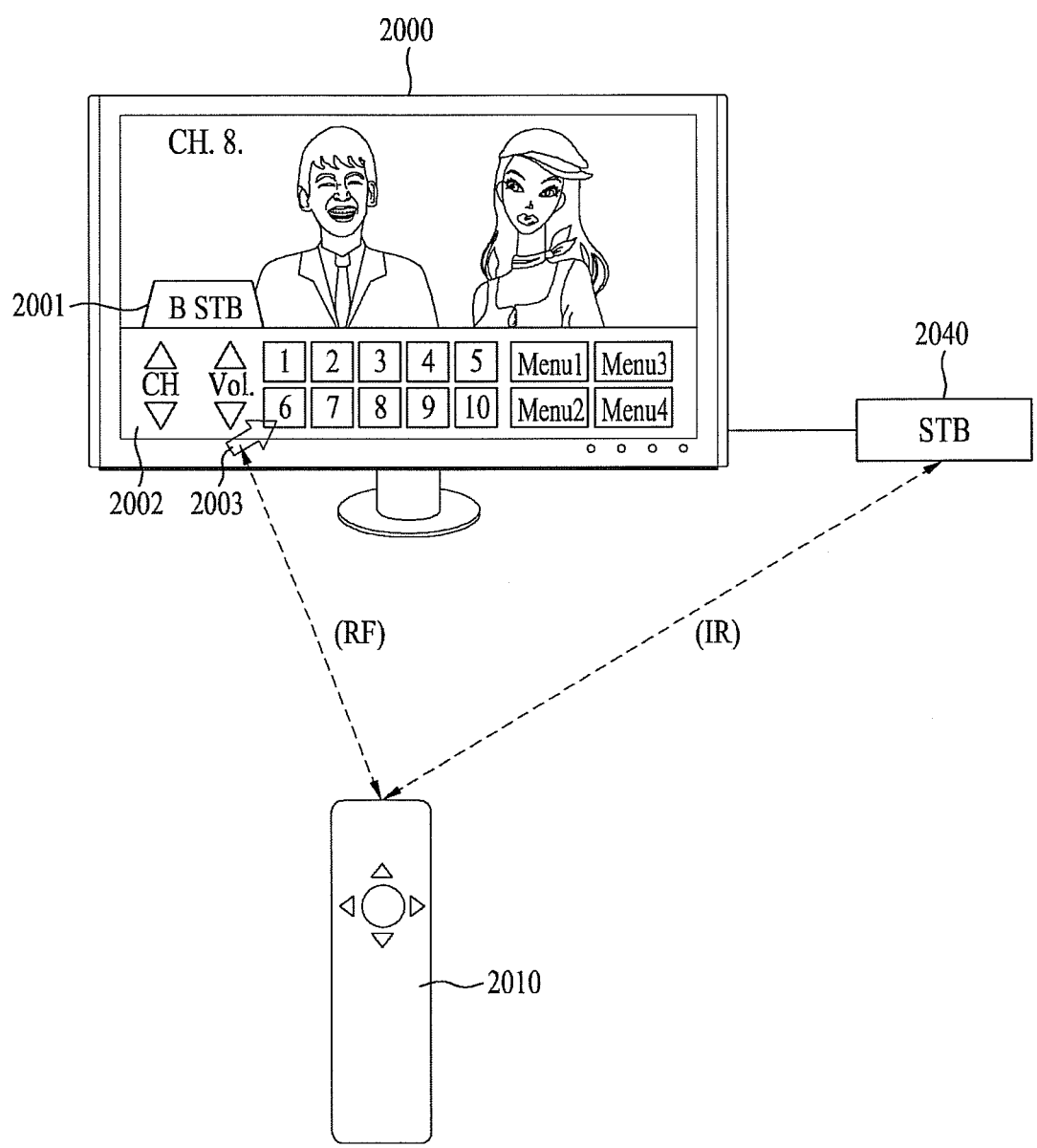
FIG. 20 is a diagram of a full process for controlling an external STB using a universal remote controller.

FIG. 20 is a diagram of a full process for controlling an external STB using a universal remote controller. With reference to the former descriptions of FIGS. 1 to 19, it is able to supplementarily interpret FIG. 20. Moreover, the following description shall be made on the assumption that a process for learning an IR signal of an STB dedicated remote controller configured to control an STB 2040 has proceeded.

Referring to FIG. 20, first of all, a multimedia device 2000 according to one embodiment of the present invention outputs a message 2001 indicating that a connected STB 2040 corresponds to a specific settop box B.

The multimedia device 2000 accesses a database storing IR signals for various electronic devices and then displays an OSD 2002 configured to list at least one or more functions provided by the connected STB 2040.

In doing so, a user is able to control the aforementioned STB 2040 using a remote controller 2010 mapped to the multimedia device 2000 without using a remote controller 2040 dedicated to the STB 2040.

For instance, the user moves the remote controller 2010 to enable a corresponding indicator 2003 to be situated in a specific region (e.g., channel #6). In doing so, the multimedia device 200 and the remote controller 2010 are connected to each other via an RF (radio frequency) communication network.

As mentioned in the foregoing description, since the multimedia device 2000 stores an IR code value corresponding to each region of the OSD 2002, the multimedia device 2000 transmits the IR code value corresponding to the channel #6 to the remote controller 2010 in a manner that the IR code value is carried on an RF signal.

Therefore, the remote controller 2010 is designed to forward the IR code value, which is received from the multimedia device 2000, to the STB 2040, thereby enabling the STB 2040 to execute a command for switching to the channel #6. In particular, the STB 2040 is preferably situated within a predetermined range for receiving an IR signal from the remote controller 2010.

Of course, in FIG. 20, the multimedia device 2000 and the remote controller 2010 are connected to each other by RF communication protocol (e.g., Bluetooth), while the remote controller 2010 and the STB 2040 are connected to each other by IR (infrared ray) communication protocol, by which the scope of the appended claims and their equivalents may be non-limited.

According to some of the embodiments described with reference to FIGS. 1 to 20, when a user selects a prescribed button of a remote controller of an external electronic device (e.g., STB), a multimedia device accesses a database saved in a memory or an external server and then brings IR code values of the remote controller of the external electronic device.

Yet, a solution for resolving a case that IR code values of the corresponding electronic device are not saved in the memory or the external server is necessary. Regarding this solution, a $2^{nd}$ embodiment shall be described in detail with reference to FIGS. 21 to 43 as follows.

Of course, it is apparent to those skilled in the art that the $2^{nd}$ embodiment described in the following with reference to FIGS. 21 to 43 can be supplementarily interpreted with reference to the description of the former embodiment shown in FIGS. 1 to 20. If the former embodiment and the $2^{nd}$ embodiment are combined together to implement another embodiment, it may apparently come within the scope of the appended claims and their equivalents.

Figure 21:
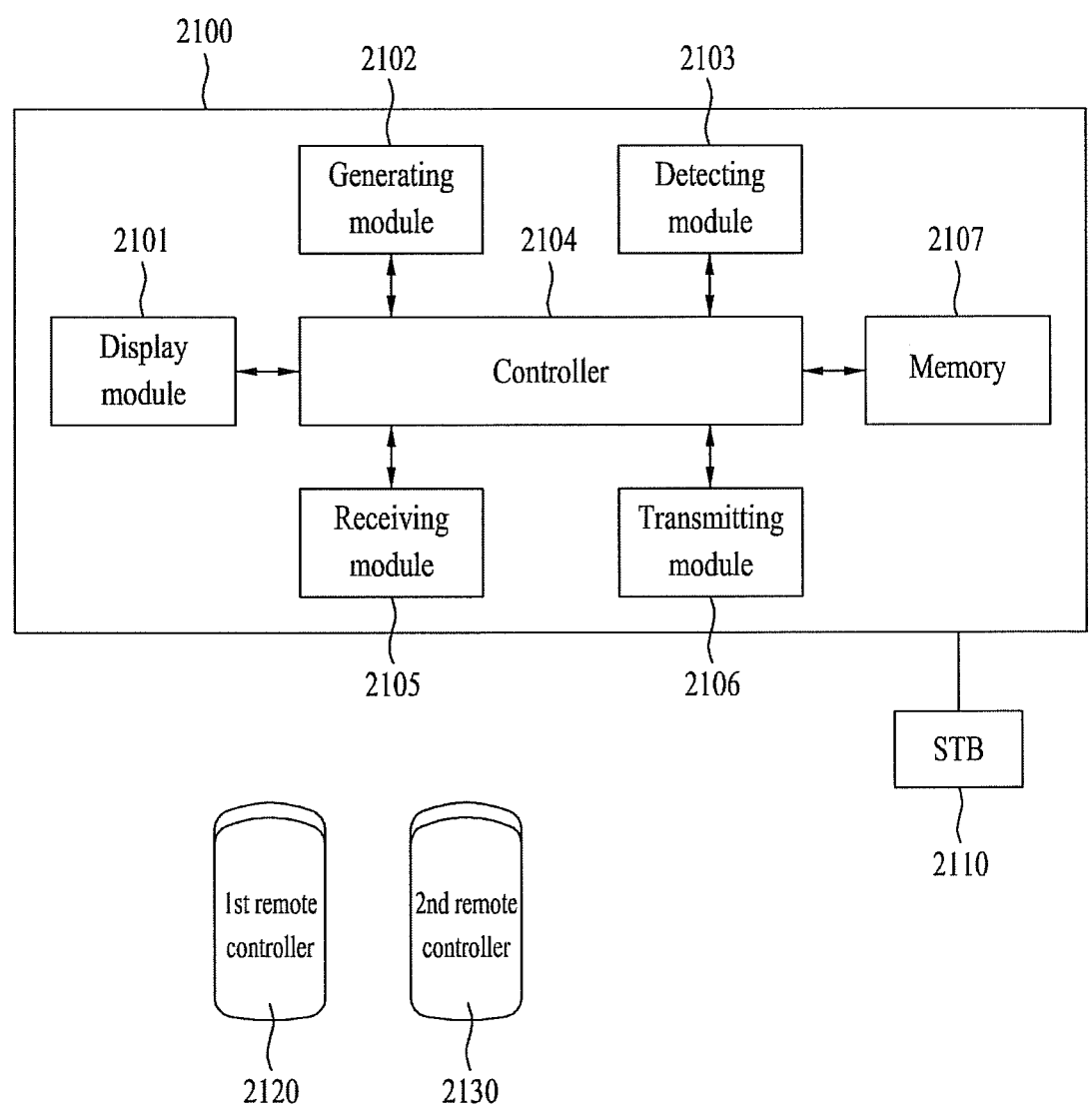
FIG. 21 is a diagram of a full system including a multimedia device according to a $2^{nd}$ embodiment of the present invention.

FIG. 21 is a diagram of a full system including a multimedia device according to a $2^{nd}$ embodiment of the present invention. In the following description, a solution for controlling an external electronic device using a remote controller of a multimedia device instead of a remote controller of the external electronic device according to a $2^{nd}$ embodiment of the present invention is explained in detail with reference to FIG. 21.

Referring to FIG. 21, a $1^{st}$ remote controller 2120 corresponds to a usage for an STB 2110 that is an external electronic device. And, a $2^{nd}$ remote controller 2130 corresponds to a usage for a multimedia device 2100. Yet, according to a $2^{nd}$ embodiment of the present invention, it is able to control the STB 2110, which is the electronic device, using the $2^{nd}$ remote controller 2130 for the multimedia device 2100.

The multimedia device 2100 according to a $2^{nd}$ embodiment of the present invention includes a display module 2101, a generating module 2102, a detecting module 2103, a controller 2104, a receiving module 2105, a transmitting module 2106, a memory 2107 and the like.

The display module 2101 is designed to display a guide message for controlling at least one function of the electronic device (e.g., the STB 2110 shown in FIG. 21). For instance, a guide message shown in FIG. 23 may be displayed.

The receiving module 2105 is designed to receive a remote control signal corresponding to a $1^{st}$ function of the at least one or more functions from the $1^{st}$ remote controller 2120 of the electronic device. And, the memory 2107 saves data for i9dentifying the $1^{st}$ function and the received remote control signal in a manner of mapping them to each other.

The generating module 2102 generates a graphic image including the data for identifying the $1^{st}$ function. In this case, the graphic image may be named a virtual remote controller and its details shall be described with reference to FIGS. 37 to 42 later.

If the data for identifying the $1^{st}$ function is selected by the $2^{nd}$ remote controller 2130 of the multimedia device 2100, the detecting module 2103 detects the remote control signal mapped to the $1^{st}$ function. For instance, the detecting module 2103 extracts an IR signal previously saved in the memory 2107.

The transmitting module 2106 transmits the extracted remote control signal to an external device. In this case, the remote control signal may correspond to an IR signal and the external device may correspond to the $2^{nd}$ remote controller 2130 or the STB 2110 for example.

Before the guide message is displayed, it may be able to design the controller 2104 to additionally control a reception of side information for identifying the electronic device. This shall be described with reference to FIG. 22 later.

The display module 2101 may be designed to sequentially output data for identifying the function previously saved in the memory 2107 based on the received side information. If the remote control signal is received, the display module 2101 may be designed to output data for identifying a function in next order. This shall be described in detail with reference to FIG. 23 later.

The transmitting module 2106 may be designed to directly transmit the extracted remote control signal to the electronic device (e.g., the STB 2110) or to indirectly transmit the extracted remote control signal to the electronic device via the $2^{nd}$ remote controller 2130.

Particularly, for example, the graphic image including the data for identifying the $1^{st}$ function may include at least one of a $1^{st}$ tab for changing a location of the graphic image, a $2^{nd}$ tab for adjusting the number of options included in the graphic image, a $3^{rd}$ tab for switching an electronic device to control, and a $4^{th}$ tab for adding a function to control.

If the $1^{st}$ tab is selected by the $2^{nd}$ remote controller 2130, the controller 2104 is designed to change the location of the graphic image into a $2^{nd}$ location on a screen from a $1^{st}$ location on the screen. This shall be described in detail with reference to FIG. 35 and FIG. 36 later.

If the $2^{nd}$ tab is selected by the $2^{nd}$ remote controller 2130, the controller 2104 is designed to change a graphic image including options of a $1^{st}$ group into a graphic image including options of a $2^{nd}$ group. This shall be described in detail with reference to FIGS. 37 to 42 later.

If the $3^{rd}$ tab is selected by the $2^{nd}$ remote controller 2130, the controller 2104 is designed to change a graphic image corresponding to a $1^{st}$ electronic device into a graphic image corresponding to a $2^{nd}$ electronic device. This shall be described in detail with reference to FIGS. 37 to 40 later.

If the $4^{th}$ tab is selected by the $2^{nd}$ remote controller 2130, the controller 2104 is designed to control data for identifying a prescribed function to be displayed in an editable format. This shall be described in detail with reference to FIG. 26 and FIG. 27 later. Meanwhile, although the terminology 'tab' is used in this specification, such a terminology as a data for identification, a graphic image and the like may be applicable.

FIGS. 22 to 25 are diagrams of a process for initially registering a remote controller of an electronic device in a remote controller of a multimedia device according to a $2^{nd}$ embodiment of the present invention.

As mentioned in the foregoing description, in order to control at least one electronic device (e.g., STB, etc.) connected to a multimedia device (e.g., a TV, etc.) using a remote controller of the multimedia device, a prescribed pre-registration procedure is required.

Figure 22:
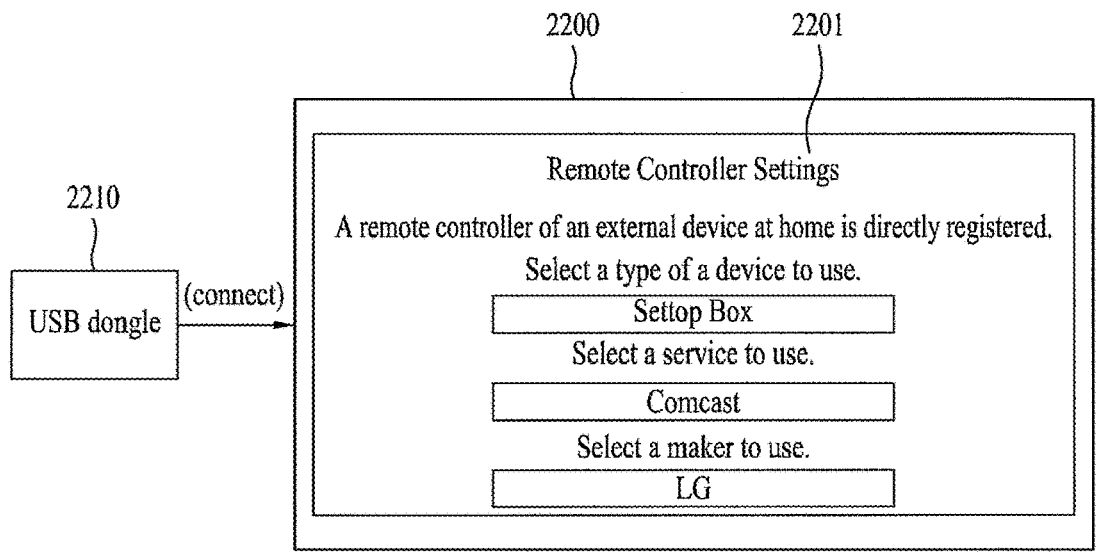
FIGS. 22 to 25 are diagrams of a process for initially registering a remote controller of an electronic device in a remote controller of a multimedia device according to a $2^{nd}$ embodiment of the present invention.

First of all, referring to FIG. 22, a multimedia device 2200 according to a $2^{nd}$ embodiment of the present invention outputs a guide message 2201 for guiding a user to input side information on an external electronic device.

Figure 23:
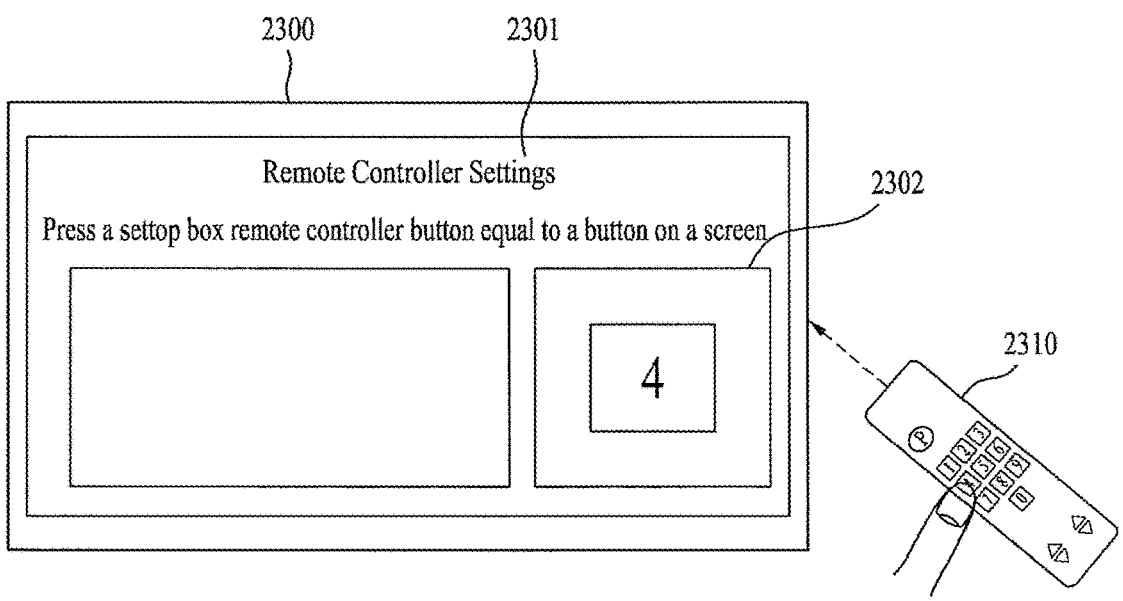

Of course, it may be able to design a guide message shown in FIG. 23 to be outputted in the first place by skipping the procedure shown in FIG. 22, which comes within the scope of the appended claims and their equivalents. Yet, in case that the process shown in FIG. 22 is performed, it is advantageous in that the guide message related process shown in FIG. 23 can be performed more quickly.

Meanwhile, a USB dongle 2210 shown in FIG. 22 is connected to the multimedia device 2200 and is designed to play a role in receiving an IR signal from a remote controller of an external electronic device. Of course, it is possible to utilize the conventional IR receiving module without adding the USB dongle 2210.

Moreover, referring to FIG. 22, if a user inputs all side informations (e.g., a type of a device, a type of a service, a maker (manufacturer) of a device, etc.) on a specific electronic device to register, the multimedia device 2200 according to a $2^{nd}$ embodiment of the present invention is able to approximately estimate necessary functions, i.e., buttons attached to a remote controller of a corresponding device (e.g., STB).

If a settop box (STB) is selected, as shown in FIG. 22, since numeral buttons are basically included in the remote controller of the STB, a multimedia device 2300 according to a $2^{nd}$ embodiment of the present invention may display a guide message 2301 shown in FIG. 23.

For example, the guide message 2301 may include information for guiding a user to press a specific button 2302 attached to the remote controller of the external electronic device to register. In doing so, the specific button '4' of the external electronic device 2310 is selected based on the guide message 2301 and a corresponding remote control IR signal is received.

Hence, the multimedia device 2300 is able to control the remote control IR signal, which corresponds to the specific button of the external electronic device, to be saved in a memory. Moreover, if the remote control IR signal is received via the USB dongle, the former message is automatically switched to a message for guiding a next input button. Moreover, appropriate buttons of the remote controller are sequentially outputted to the guide message 2301 based on the device type, the service type, the maker information and the like selected in FIG. 22, which is one feature of the present invention.

Meanwhile, if the process shown in FIG. 22 is skipped, it may be unable to estimate a button included in the remote controller at all or a user may intend to change a name of a button necessarily. To solve these problems, it is possible to edit a name of a function to be added as a remote control function of a specific external electronic device, as shown in FIG. 24.

Figure 24:
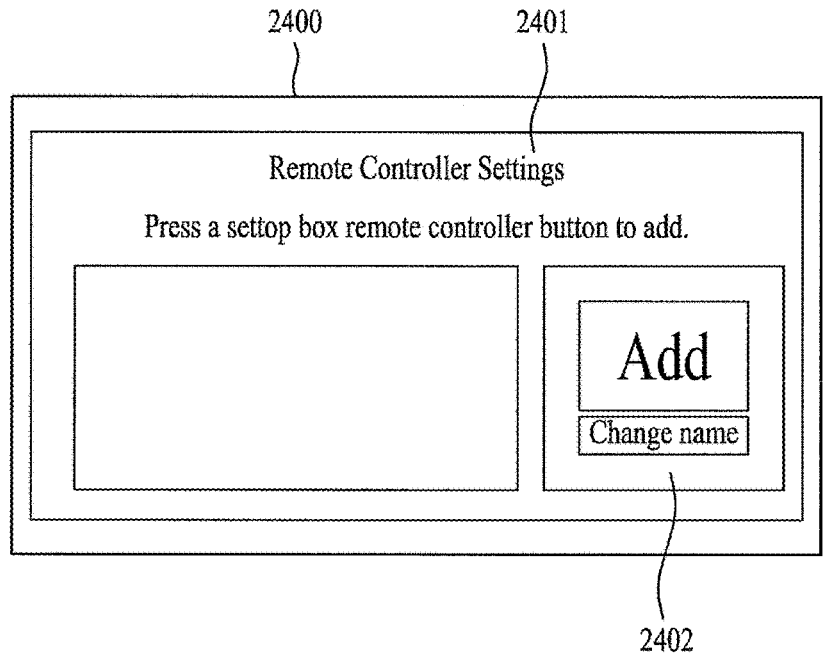

Referring to FIG. 24, a multimedia device 2400 according to a $2^{nd}$ embodiment of the present invention outputs a message 2401 for adding a button (or function) to a virtual remote controller. And, the multimedia device 2400 provides an option 2402 for changing a name physically engraved on a button of a remote controller of an external electronic device. Hence, although English letters 'CH. UP' are engraved on a remote controller of an STB, Korean letters '채널 높임' for the same function may be designed to be displayed on a virtual remote controller provided by a $2^{nd}$ embodiment of the present invention.

Figure 25:
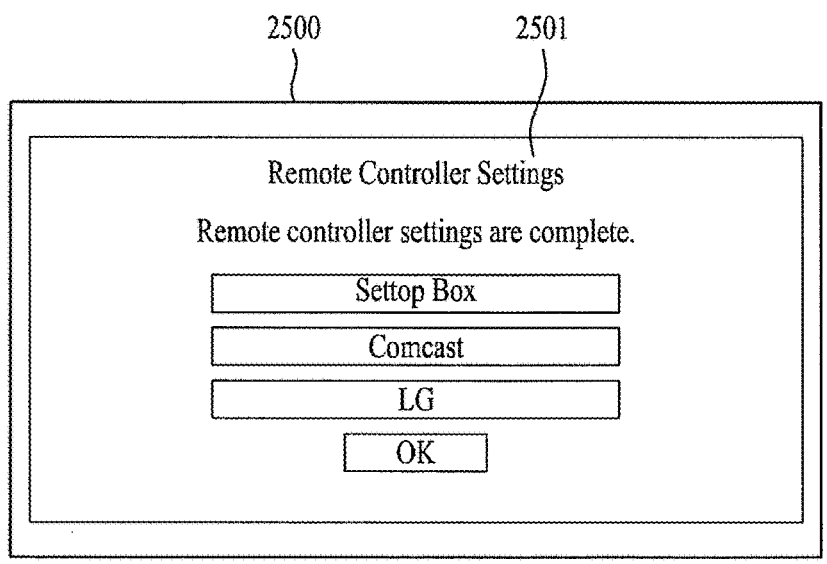

If all of the processes described with reference to FIGS. 22 to 24 are completed (skipping some of the processes comes within the scope of the appended claims and their equivalents), referring to FIG. 25, a multimedia device 2500 outputs a message 2501 indicating that the remote controller settings for the external electronic device 'STB' are complete. Therefore, it is advantageous in that the user is able to control both of the multimedia device and the STB using the remote controller of the multimedia device instead of using the remote controller of the external electronic device 'STB'.

Figure 26:
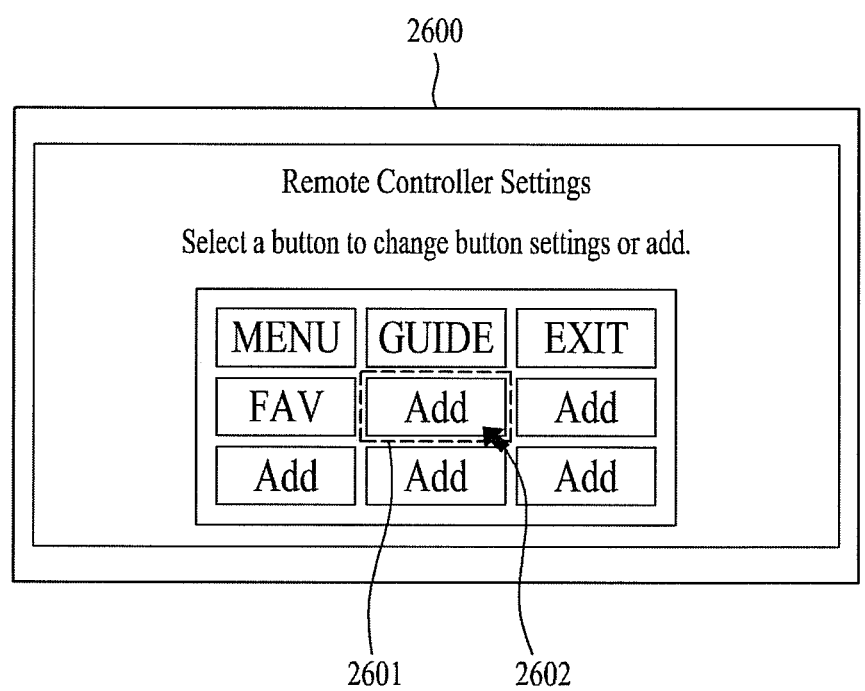
FIGS. 26 to 28 are diagrams of a process for editing functions of a pre-registered specific remote controller according to a $2^{nd}$ embodiment of the present invention.
Figure 27:
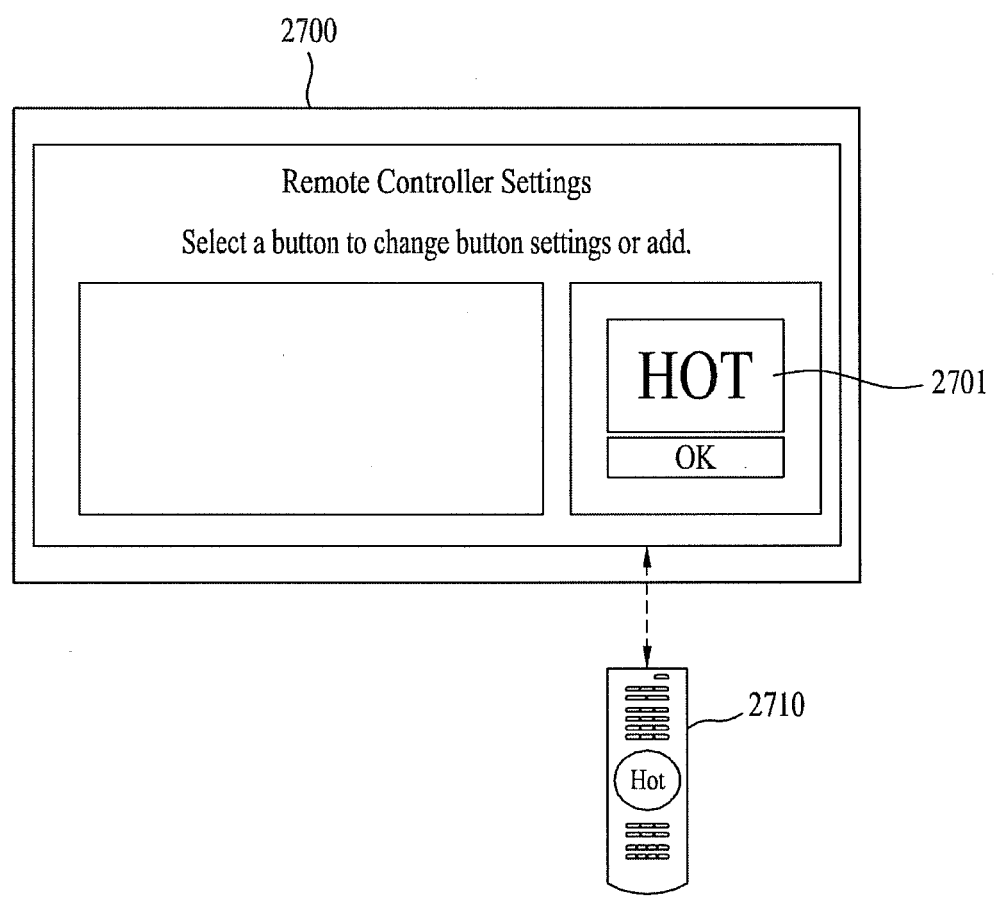
Figure 28:
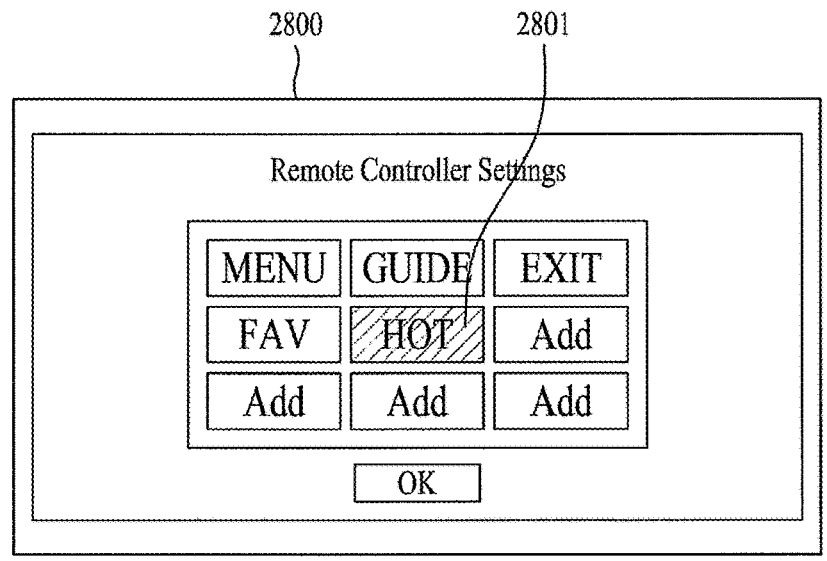

FIGS. 26 to 28 are diagrams of a process for editing functions of a pre-registered specific remote controller according to a $2^{nd}$ embodiment of the present invention. As mentioned in the foregoing description with reference to FIG. 24 in brief, according to a $2^{nd}$ embodiment of the present invention, it is possible to arbitrarily change a name of a button attached to a remote controller of an external electronic device.

First of all, after the remote controller settings mentioned in the foregoing description have been primarily completed, referring to FIG. 26, a multimedia device 2600 according to a $2^{nd}$ embodiment of the present invention outputs functions (e.g., MENU, GUIDE, EXIT, FAV, etc.) of a virtual remote controller corresponding to a pre-registered external electronic device.

In doing so, if an indicator 2602, which moves in response to a motion of a remote controller of the multimedia device 2600, is situated in a region 'Add' 2601, a screen shown in FIG. 26 is switched to a screen shown in FIG. 27. If a user is not satisfied with a current virtual remote controller but intends to add more functions to the virtual remote controller or to change a name of a pre-registered function, the screen shown in FIG. 27 is applicable.

Referring to FIG. 27, a multimedia device 2700 according to a $2^{nd}$ embodiment of the present invention displays a guide message. And, a name 2701 of a specific button (or function) of an external electronic device (e.g., STB) is then inputted. If a button (e.g., button 'HOT') to be mapped to the current name 2701 is selected using a remote controller 2710 of the external electronic device, a corresponding IR signal is transmitted to the multimedia device 2700 via USB dongle or the like.

Hence, referring to FIG. 28, a multimedia device 2800 according to a $2^{nd}$ embodiment of the present invention is able to display a virtual remote controller to which a button 'HOT' 2801 is added. Comparing FIG. 28 to FIG. 26, it is apparent to those skilled in the art that the button 'HOT' 2801 is further included.

FIGS. 29 to 34 are detailed diagrams of the initial registration process shown in FIGS. 22 to 25. FIGS. 29 to 34 show another example of the former registration process shown in FIGS. 22 to 25. And, the scope of the appended claims and their equivalents should be based on the items described in the appended claims.

Figure 29:
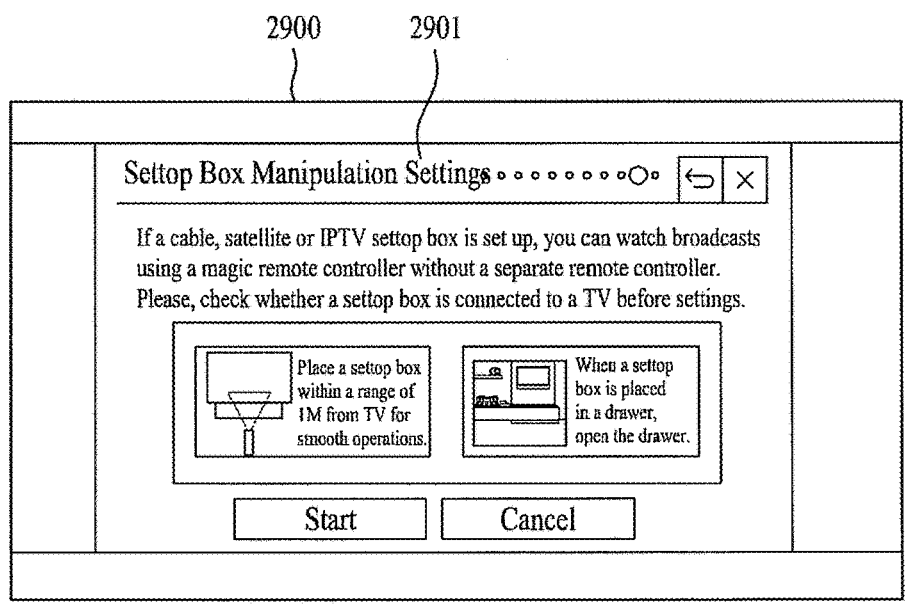
FIGS. 29 to 34 are detailed diagrams of the initial registration process shown in FIGS. 22 to 25.

First of all, referring to FIG. 29, a message 2901 for registering a remote controller of an STB connected to a multimedia device 2900 is displayed. A magic remote controller shown in FIG. 29 corresponds to a remote controller of the multimedia device 2900. And, it is not necessary for a motion sensor to be attached to the magic remote controller.

Meanwhile, in the course of performing the registration procedure shown in FIG. 29, an IR signal generated from a remote controller of an STB is received by a USB dongle of the multimedia device 2900 as well as by the STB. Hence, a response to the IR signal received by the STB may be temporarily disabled. Of course, the responding operation of the STB may be exactly outputted by the multimedia device 2900, which comes within the scope of the appended claims and their equivalents.

Figure 30:
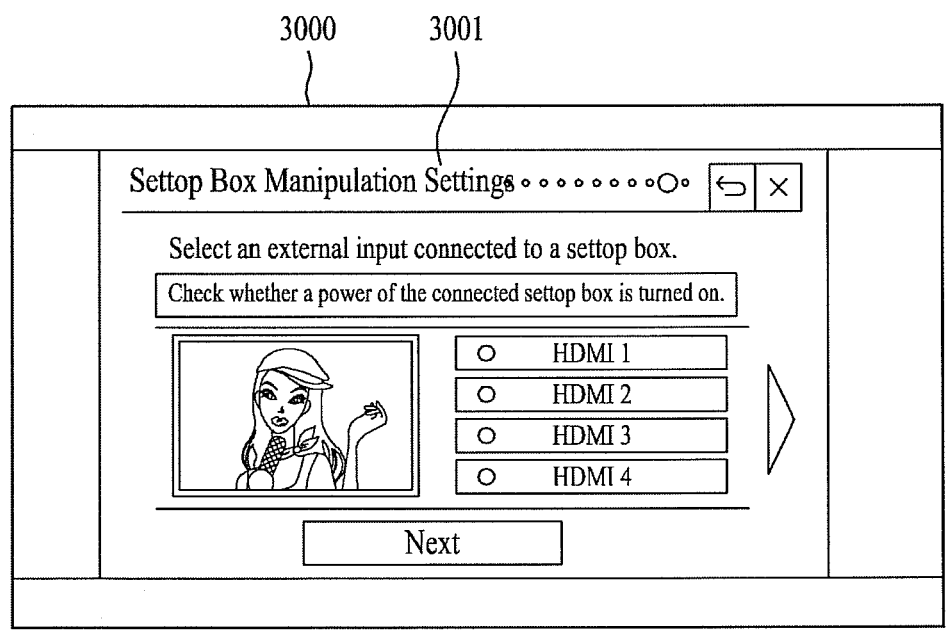

Moreover, if the guide operation process shown in FIG. 29 is completed, referring to FIG. 30, a multimedia device 3000 according to a $2^{nd}$ embodiment of the present invention outputs a guide message 3001 for guiding a selection of an external input of a connected STB.

Figure 31A:
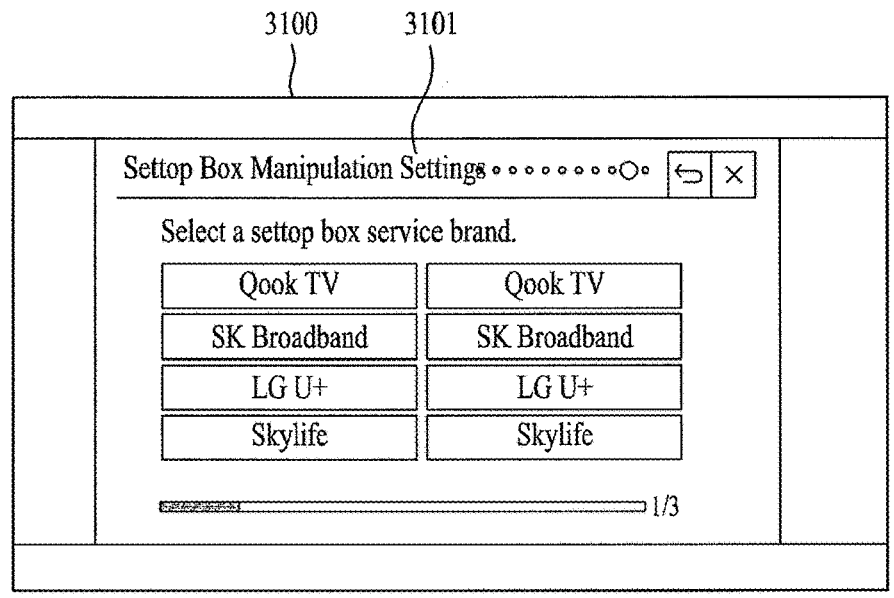

If the guide operation process shown in FIG. 30 is completed, referring to FIG. 31A, a multimedia device 3100 according to a $2^{nd}$ embodiment of the present invention outputs a guide message 3101 for guiding a selection of a service brand of a settop box (STB). For instance, this embodiment is applicable to such a country as Korea and the like and is also applicable to other countries.

Figure 31B:
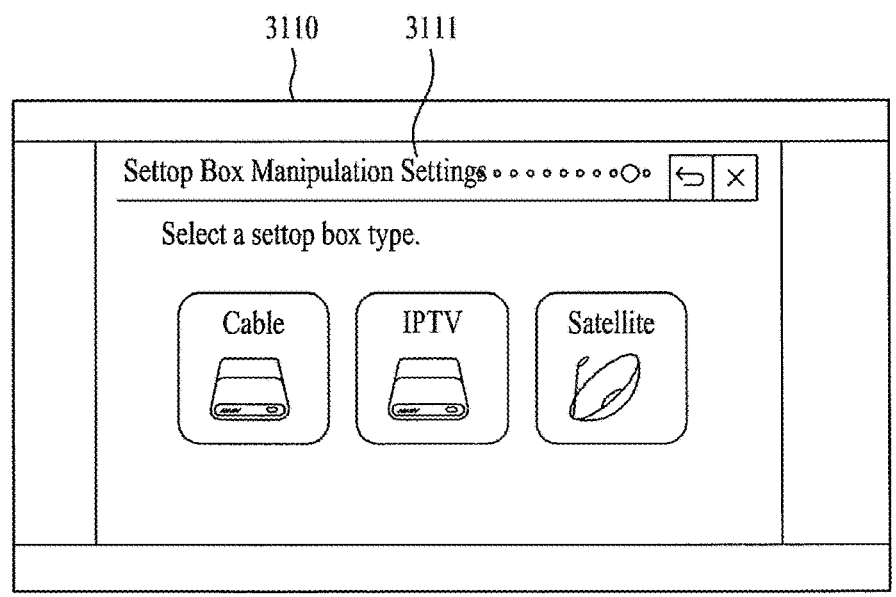

On the other hand, if the guide operation process shown in FIG. 30 is completed, referring to FIG. 31B, a multimedia device 3110 according to a $2^{nd}$ embodiment of the present invention outputs a guide message 3111 for guiding a selection of a type of a settop box (STB). For instance, this embodiment is applicable to such a country as U.S.A. and the like and is also applicable to other countries. Designing a guide message different for each corresponding country comes within the scope of the appended claims and their equivalents.

Figure 32:
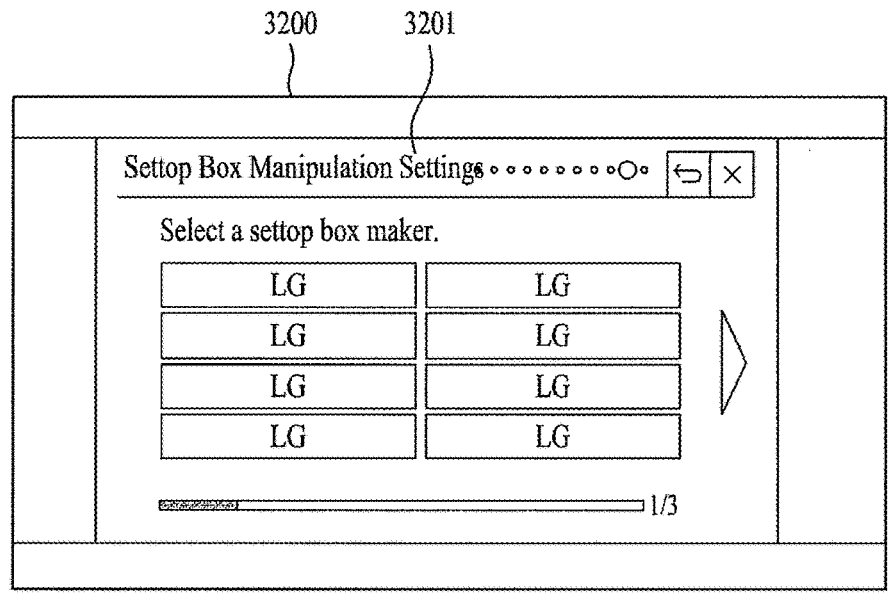

If the guide operation process shown in FIG. 31A or FIG. 31B is completed, referring to FIG. 32, a multimedia device 3200 according to a $2^{nd}$ embodiment of the present invention outputs a guide message 3201 for guiding a selection of a maker of a settop box (STB). Yet, as mentioned in the foregoing description with reference to FIGS. 22 to 24, it is possible to implement the present invention by omitting the guide messages described with reference to FIGS. 29 to 32.

Figure 33:
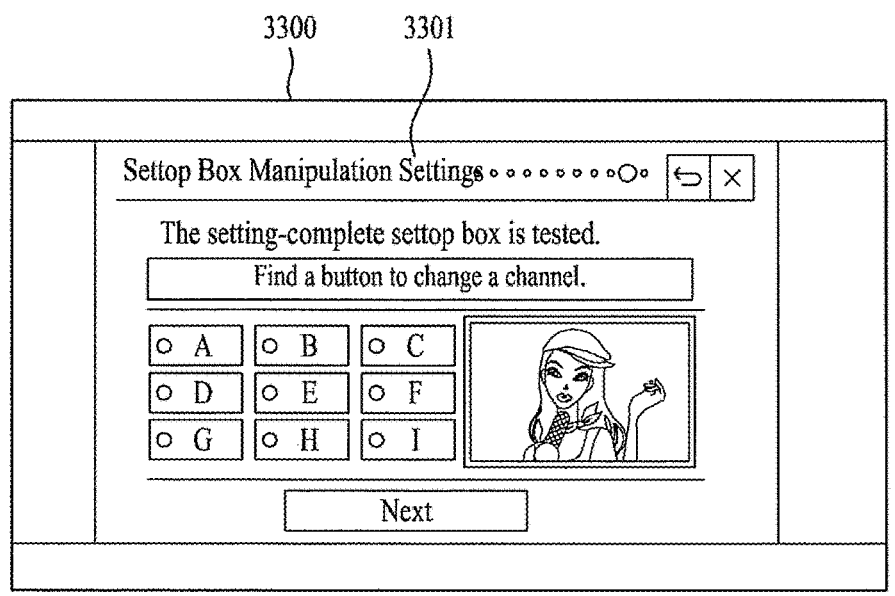

Meanwhile, if the guide operation process shown in FIG. 32 is completed, referring to FIG. 33, a multimedia device 3300 according to a $2^{nd}$ embodiment of the present invention outputs a name of a button, which is estimated as attached to a remote controller of an STB, to a $1^{st}$ region and also outputs a guide message 3101 for guiding a selection of the corresponding button to a $2^{nd}$ region. The number of buttons may vary in accordance with a maker. If a corresponding IR signal is received (e.g., a channel switching button is applied), outputting a channel switched screen together comes within the scope of the appended claims and their equivalents. If such a feedback function is provided, it is advantageous in checking whether a user presses a correct button.

Figure 34:
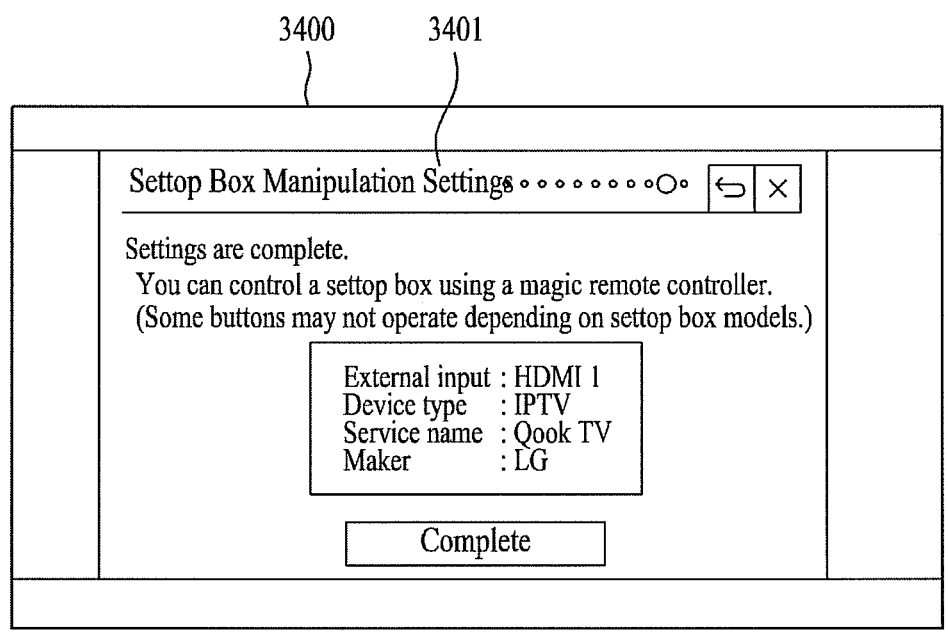

Finally, If the guide operation process shown in FIG. 33 is completed, referring to FIG. 34, a multimedia device 3400 according to a $2^{nd}$ embodiment of the present invention outputs a message 3401 for guiding that a remote controller for an external electronic device (e.g., STB) has been registered as a virtual remote controller. In this case, a user may be able to randomly edit an external input, a device type, a service name, a maker and the like if necessary. And, the user is able to change an ID for paging the virtual remote controller.

Figure 35:
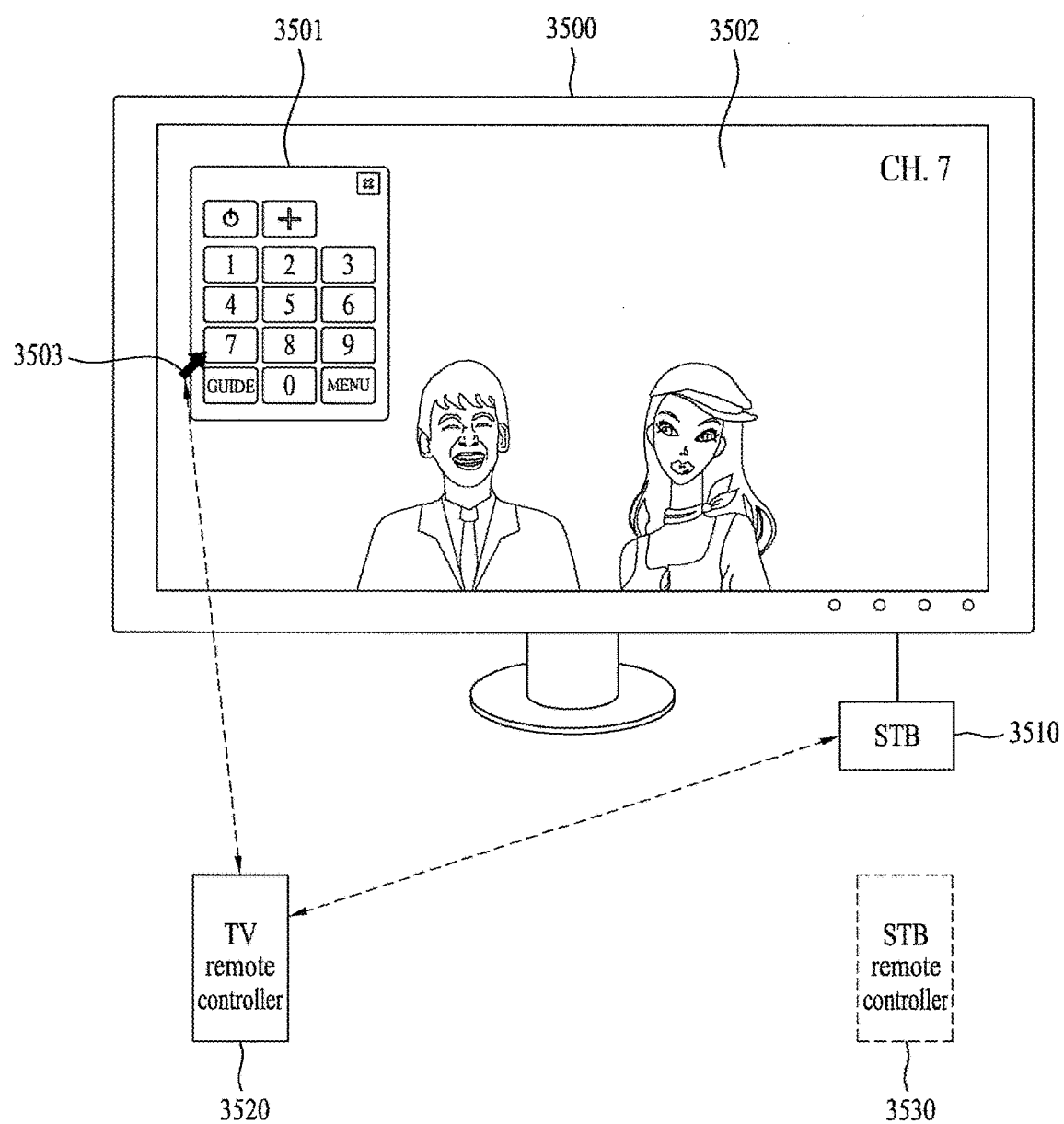
FIG. 35 is a diagram to describe a process for controlling an electronic device connected to a multimedia device using a remote controller of the multimedia device according to a $2^{nd}$ embodiment of the present invention.

FIG. 35 is a diagram to describe a process for controlling an electronic device connected to a multimedia device using a remote controller of the multimedia device according to a $2^{nd}$ embodiment of the present invention.

Referring to FIG. 35, as mentioned in the foregoing description, assume that a registration process for a remote controller 3530 of an STB 3510 connected to a multimedia device 3500 is normally completed. Hence, it is advantageous in that a user may not need to use the remote controller 3530 of the STB 3510.

While the multimedia device 3500 is outputting a normal broadcast screen 3502, if a user pages a virtual remote controller using a remote controller 3520 of the multimedia device 3500, a graphic image corresponding to the virtual remote controller 3501 configured to control the STB 3510 is outputted.

The graphic image of the virtual remote controller 3501 may have the same configuration of the STB remote controller 3530 or a configuration similar to that of the STB remote controller 3530, which depends on a function registered by a user.

Meanwhile, for instance, if a user controls an indicator 3503 to be situated at an image (e.g., number 7 in FIG. 35) of a specific region within the virtual remote controller 3501 using the remote controller 3520 of the multimedia device 3500, an IR signal previously saved in a memory of the multimedia device 3500 is externally transmitted.

For instance, a command IR signal for the number 7 is delivered to the STB 3510 via the remote controller 3520 of the multimedia device 3500. Hence, a broadcast screen on the channel 7 is outputted instead of a current broadcast screen. Since the remote controller 3520 includes a motion recognizing sensor, as mentioned in the foregoing description with reference to FIG. 4 and FIG. 5, selecting a random region within the virtual remote controller 3501 using one of a touch sensor, an arrow button and the like naturally comes within the scope of the appended claims and their equivalents.

Figure 36:
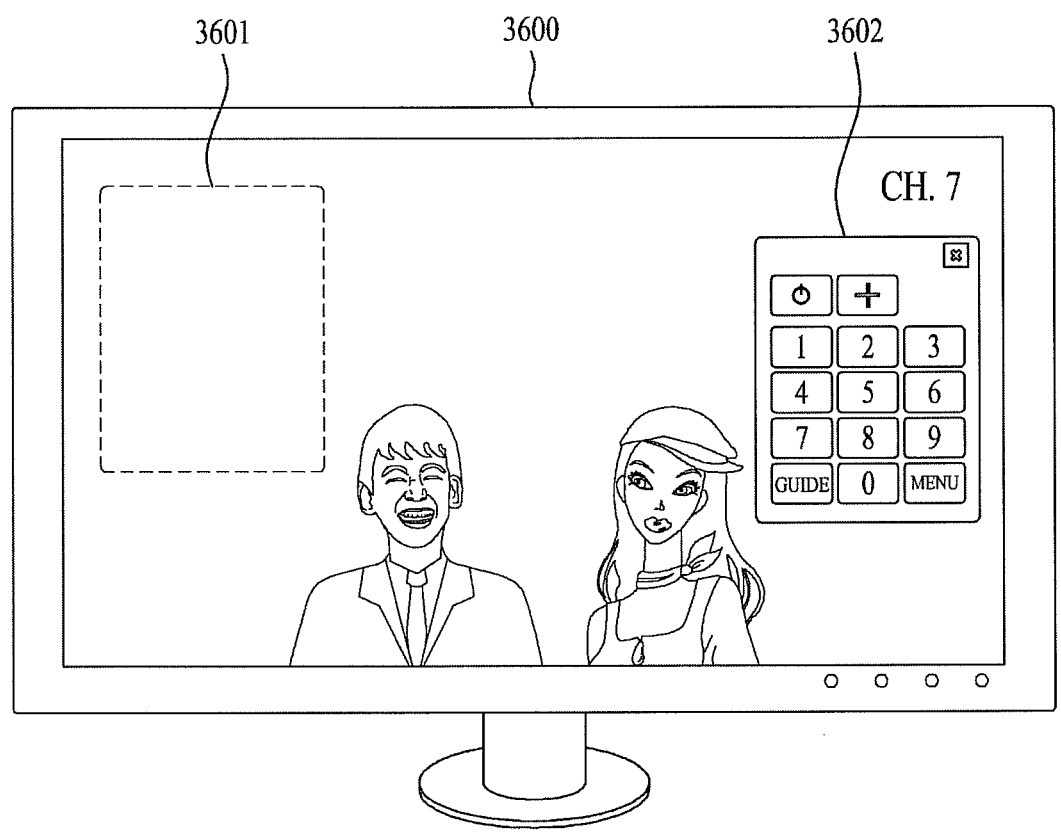
FIG. 36 is a diagram to describe a process for changing a location of a graphic image (i.e., a virtual remote controller) configured to control a specific electronic device according to a $2^{nd}$ embodiment of the present invention.

FIG. 36 is a diagram to describe a process for changing a location of a graphic image (i.e., a virtual remote controller) configured to control a specific electronic device according to a $2^{nd}$ embodiment of the present invention. In FIG. 35, assume that the graphic image 3501 of the virtual remote controller is situated at a left top end of the screen. In the following description, an option for changing a location of the graphic image of the virtual remote controller is explained with reference to FIG. 35 and FIG. 36.

First of all, referring to FIG. 35, the graphic image of the virtual remote controller is fixed to a specific location unless special settings. Yet, in case that the graphic image of the virtual remote controller is dragged using the remote controller 3520 of the multimedia device 3500 shown in FIG. 35, referring to FIG. 36, a multimedia device 3600 changes a graphic image 3601 at a $1^{st}$ location into a graphic image 3602 at a $2^{nd}$ location. Of course, contents of the two graphic images are substantially identical to each other. Particularly, this is possible owing to the motion recognizing sensor located on the remote controller 3520 of the multimedia device 3500 shown in FIG. 35.

Yet, according to another embodiment, a shortcut key for changing a location of the virtual remote controller may be added to the remote controller 3520. According to a further embodiment, an option for changing a location of the virtual remote controller 3602 may be designed to be included in the virtual remote controller.

Figure 37:
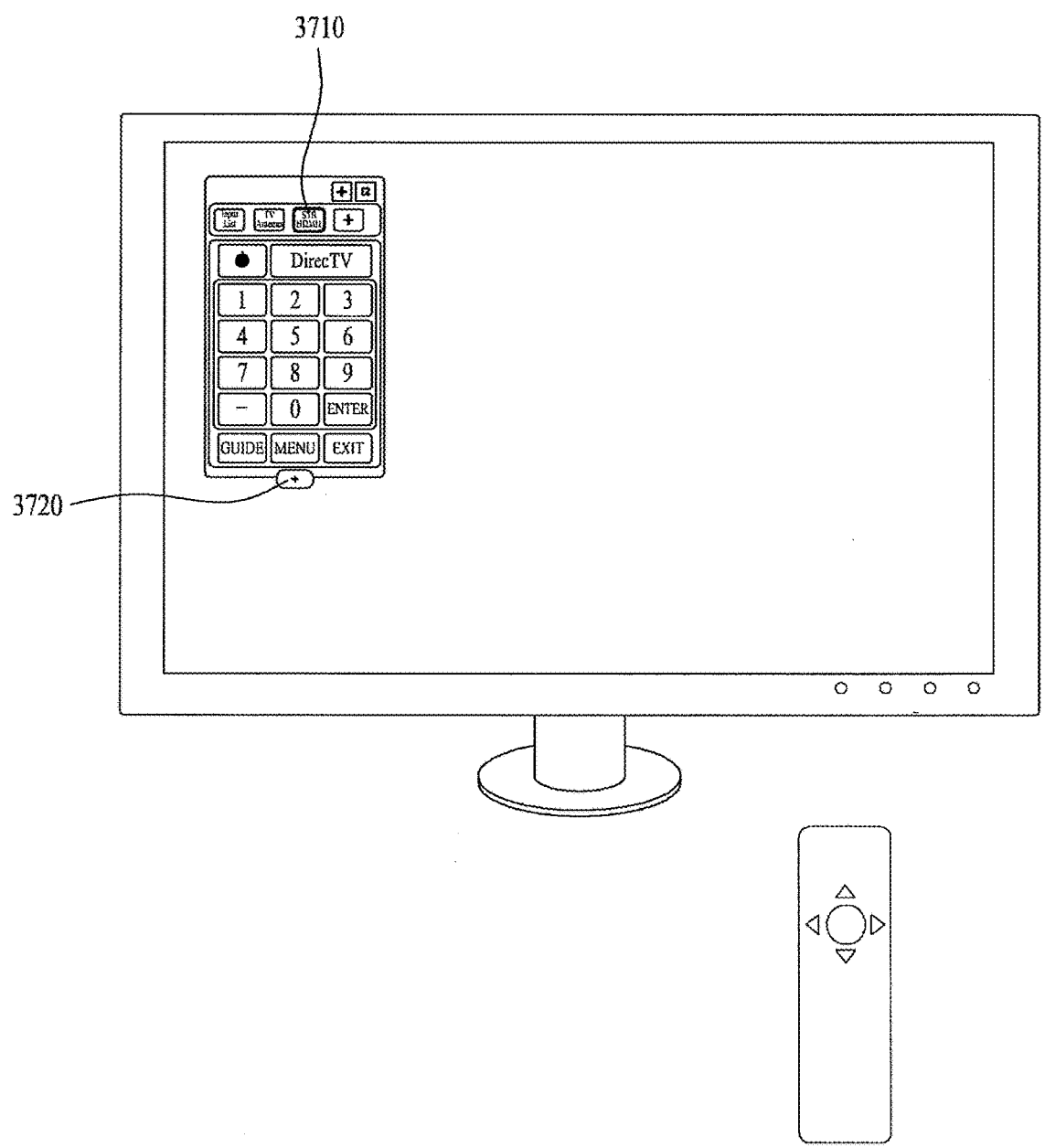
FIG. 37 and FIG. 38 are diagrams to describe a process for adjusting options included in a virtual remote controller according to a $2^{nd}$ embodiment of the present invention.
Figure 38:
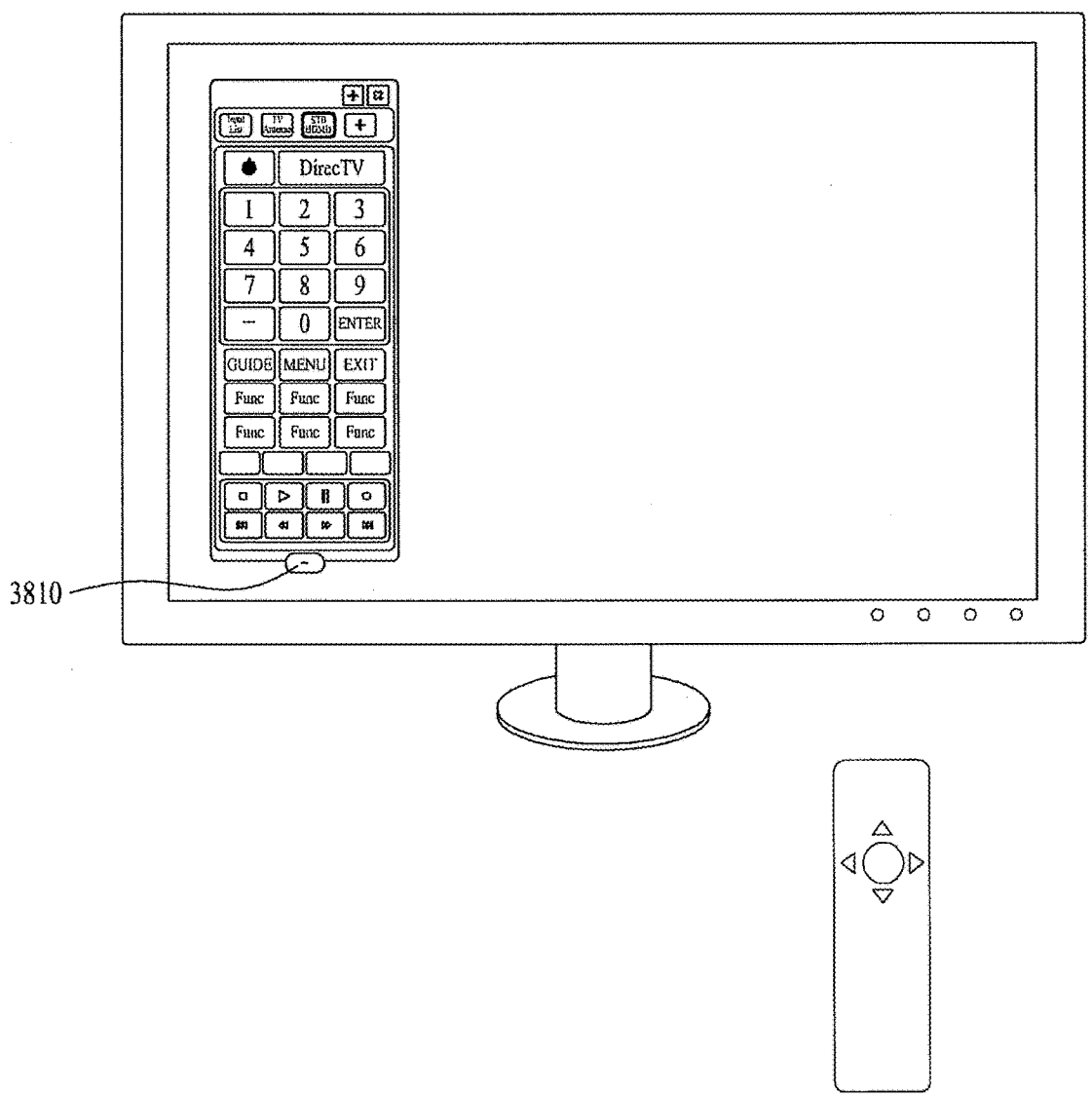

FIG. 37 and FIG. 38 are diagrams to describe a process for adjusting options included in a virtual remote controller according to a $2^{nd}$ embodiment of the present invention. In the following description, two kinds of versions of a virtual remote controller according to a $2^{nd}$ embodiment of the present invention are explained in detail with reference to FIG. 37 and FIG. 38.

First of all, as mentioned in the foregoing description, a user is able to arbitrarily edit a graphic image of a virtual remote controller for controlling an external electronic device connected to a multimedia device. For instance, some buttons of a remote controller of an STB may be frequently used by a user, while the rest may not. It is impossible to edit the remote controller of the STB. Yet, according to a $2^{nd}$ embodiment of the present invention, it may be able to set at least two versions of a virtual remote controller corresponding to an STB.

In order to page a virtual remote controller corresponding to an STB connected via HDMI 1, referring to FIG. 37, a corresponding image data 3710 is selected. In this case, basic buttons set up by a user are included only. Yet, in case of attempting to check the buttons infrequently used as well, the user may select a specific image data 3720 shown in FIG. 37.

If the specific image data 3720 is selected, referring to FIG. 38, all buttons included in the virtual remote controller of the STB are displayed together. On the other hand, if a specific image data 3810 shown in FIG. 38 is selected, the reduced virtual remote controller shown in FIG. 37 is displayed again.

Meanwhile, a user may be able to randomly set up functions (of $1^{st}$ group) included in a virtual remote controller of a $1^{st}$ version shown in FIG. 37 and functions (of $2^{nd}$ group) included in a virtual remote controller of a $2^{nd}$ version shown in FIG. 38. In aspect of technical idea, the $2^{nd}$ group may include the $1^{st}$ group.

Therefore, the present embodiment brings the following technical effect. First of all, a user is able to utilize various versions of a virtual remote controller for the same external electronic device depending on significance of a currently watched broadcast program.

Figure 39:
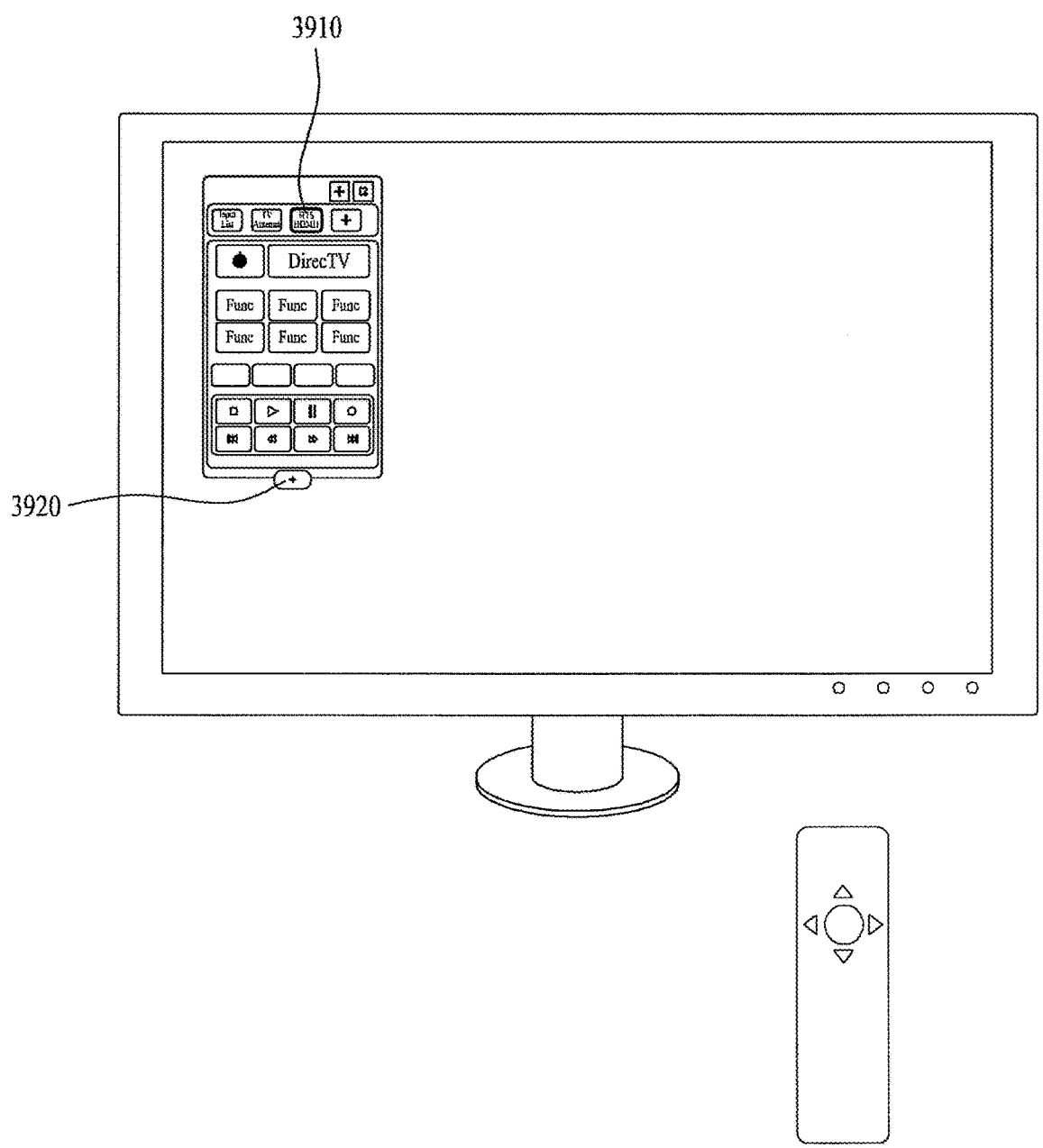
FIG. 39 and FIG. 40 are diagrams to describe a process for selecting a specific electronic device to control from a virtual remote controller according to a $2^{nd}$ embodiment of the present invention.
Figure 40:
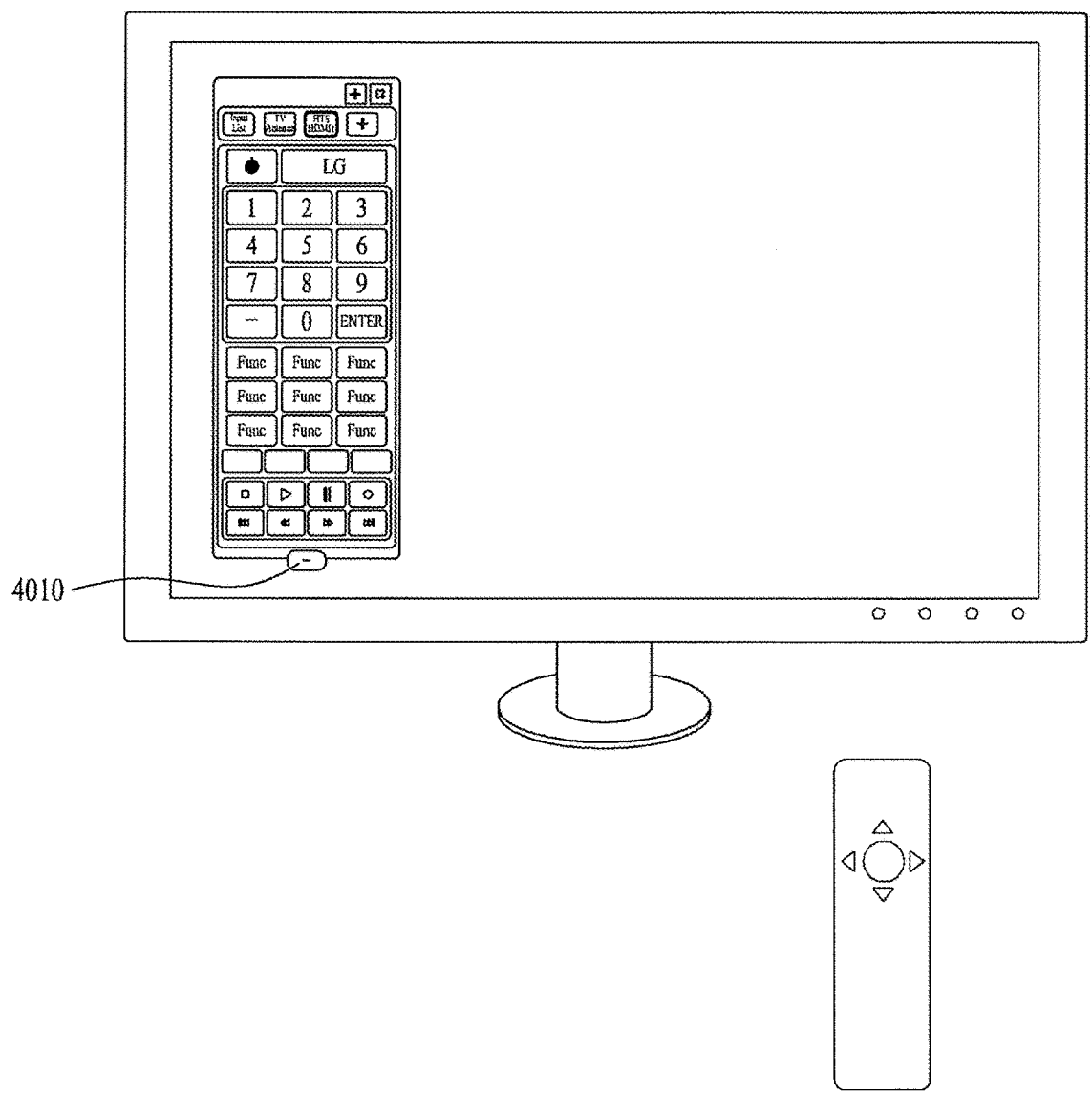

FIG. 39 and FIG. 40 are diagrams to describe a process for selecting a specific electronic device to control from a virtual remote controller according to a $2^{nd}$ embodiment of the present invention. In the following description, a process for changing a virtual remote controller into a configuration appropriate for a type of an external electronic device to control according to a $2^{nd}$ embodiment of the present invention shall be explained in detail with reference to FIG. 39 and FIG. 40.

First of all, assume that a virtual remote controller shown in FIG. 39 corresponds to a BD (Blu-ray) disc. Options for identifying an electronic device to control are included in a top end of the virtual remote controller.

In case of attempting to page a virtual remote controller for an HTS (home theater system) connected via HDMI 1, a specific option 3910 shown in FIG. 39 is selected. If so, FIG. 39 switches to FIG. 40. And, FIG. 40 corresponds to a virtual remote controller for an external electronic device 'HTS'.

Meanwhile, an enlarging tab 3920 shown in FIG. 39 and a reducing tab 4010 shown in FIG. 40 can refer to the former descriptions with reference to FIG. 37 and FIG. 38 and its details shall be omitted from the following description.

Figure 41:
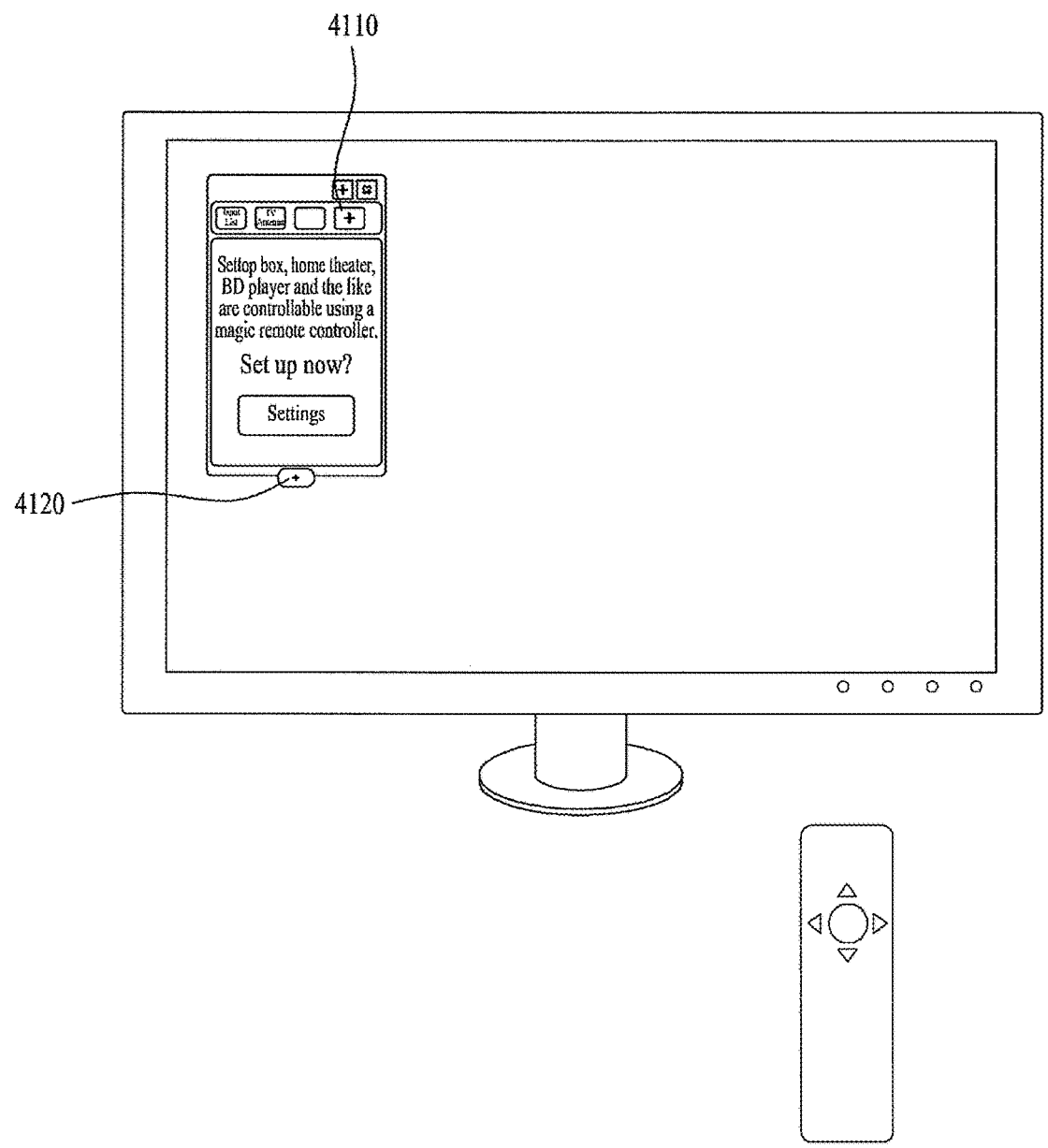
FIG. 41 and FIG. 42 are diagrams to describe a process for adding a specific electronic device to control or a specific function to a virtual remote controller according to a $2^{nd}$ embodiment of the present invention.
Figure 42:
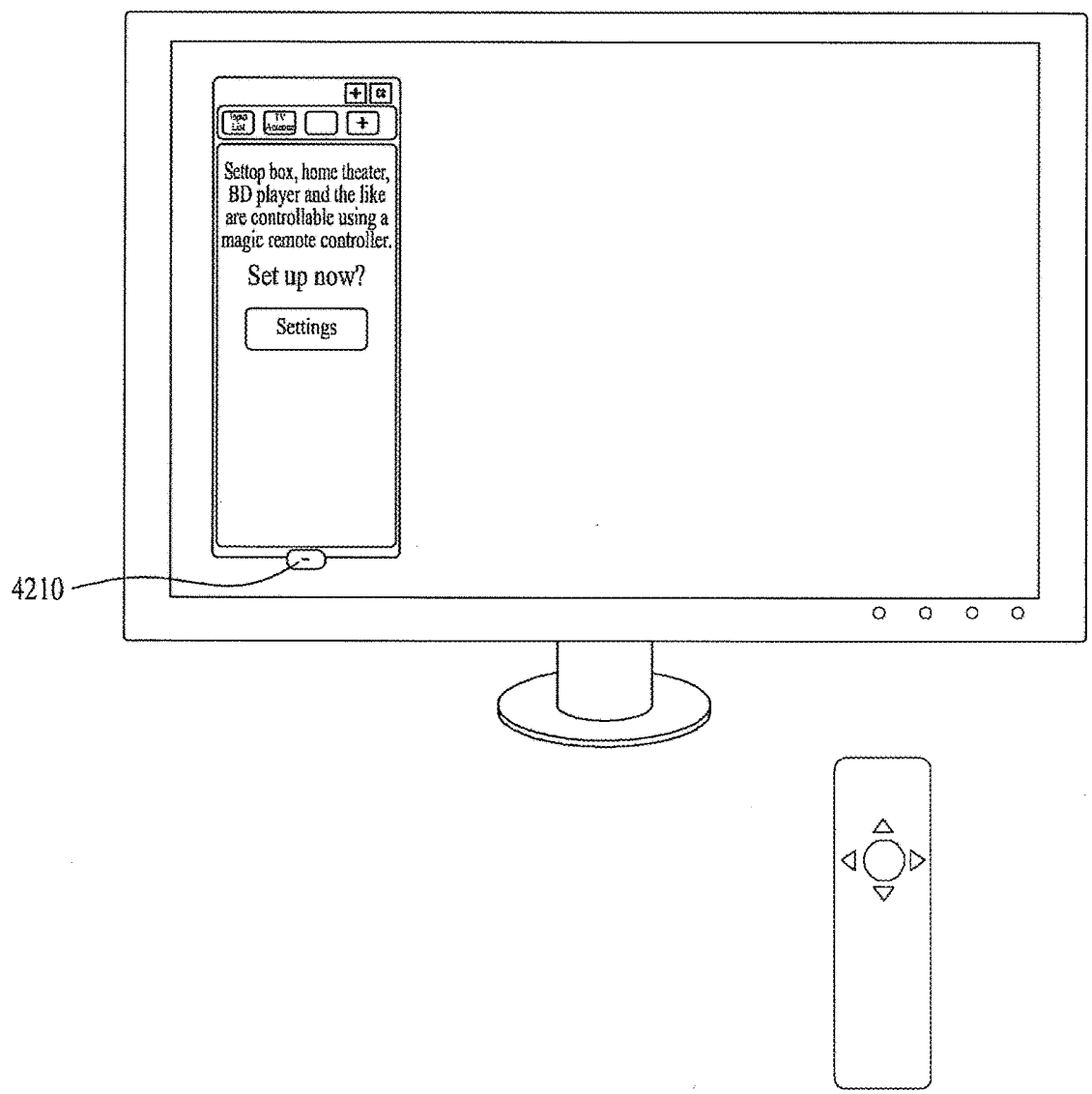

FIG. 41 and FIG. 42 are diagrams to describe a process for adding a specific electronic device to control or a specific function to a virtual remote controller according to a $2^{nd}$ embodiment of the present invention. In the following description, a process for adding a specific electronic device to control or a specific function to control to a virtual remote controller according to a $2^{nd}$ embodiment of the present invention shall be explained with reference to FIG. 41 and FIG. 42.

First of all, while a user is using a current virtual remote controller, a need for registering a new electronic device or a need for adding another function to a virtual remote controller of a currently registered electronic device may be generated.

In doing so, referring to FIG. 41 or FIG. 42, if a specific tab 4110 is selected from the virtual remote controller, a guide message for registering a virtual remote controller of another electronic device is outputted. Hence, virtual remote controller settings for a new electronic device can proceed quickly by referring to the former descriptions with reference to FIGS. 22 to 24 or FIGS. 29 to 34. Although FIG. 41 and FIG. 42 show the examples of registering an electronic device only, it may be possible to add a different function of an external electronic device corresponding to a currently active virtual remote controller only. In this case, the former embodiments mentioned with reference to FIGS. 26 to 28 are applicable.

Meanwhile, an enlarging tab 4120 shown in FIG. 41 and a reducing tab 4210 shown in FIG. 42 can refer to the former descriptions with reference to FIG. 37 and FIG. 38 and its details shall be omitted from the following description.

Figure 43:
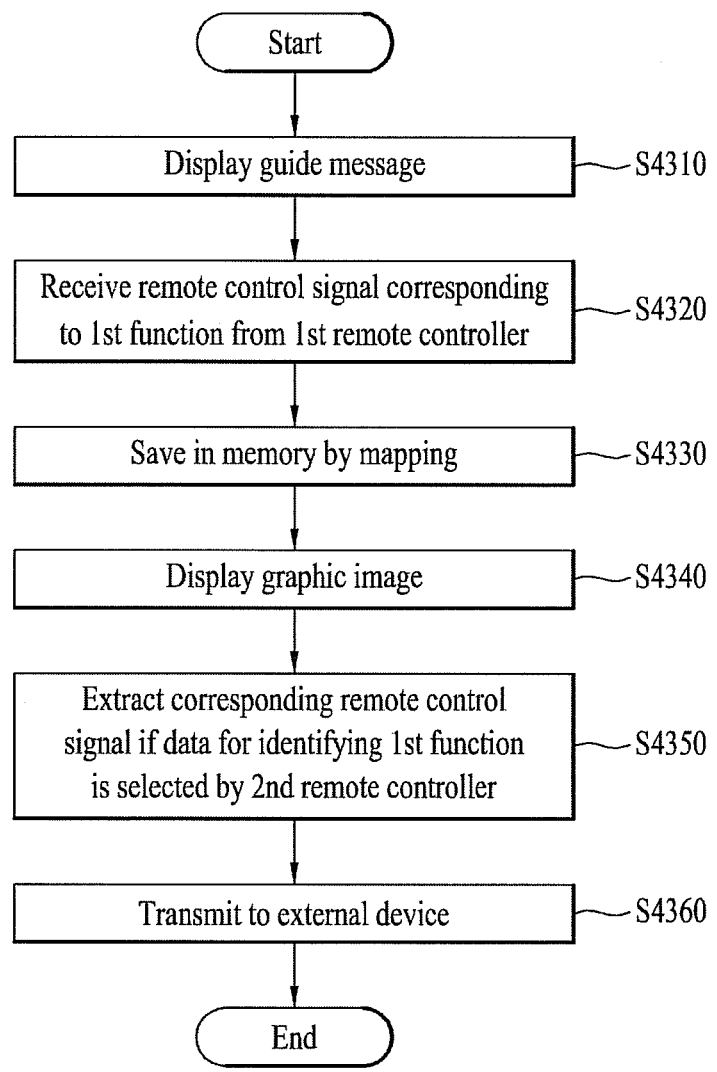
FIG. 43 is a flowchart for a method of controlling an electronic device using a remote controller of a multimedia device according to a $2^{nd}$ embodiment of the present invention.

FIG. 43 is a flowchart for a method of controlling an electronic device using a remote controller of a multimedia device according to a $2^{nd}$ embodiment of the present invention. And, the former descriptions with reference to FIGS. 21 to 42 or FIGS. 1 to 20 can be referred to for the supplementary description of FIG. 43.

Referring to FIG. 43, a multimedia device according to a $2^{nd}$ embodiment of the present invention displays a guide message for controlling at least one or more functions of an electronic device [S4310].

The multimedia device receives a remote control signal corresponding to a $1^{st}$ function among the at least one or more functions from a $1^{st}$ remote controller of the electronic device [S4320]. The multimedia device maps a data for identifying the $1^{st}$ function and the received remote control signal to each other and then saves the mapped data and signal in a memory [S4330].

The multimedia device displays a graphic image including the data for identifying the $1^{st}$ function [S4340]. If the data for identifying the $1^{st}$ function is selected by a $2^{nd}$ remote controller of the multimedia device, the multimedia device extracts the remote control signal mapped to the $1^{st}$ function [S4350].

Subsequently, the multimedia device transmits the extracted remote control signal to an external device (e.g., the external electronic device, the 2nd remote controller, etc.) [S4360].

Optionally, prior to the displaying step S4310, a step of receiving side information for identifying the electronic device can be further included.

In particular, the guide message displaying step S4310 may be designed to sequentially output data for identifying functions previously saved in the memory based on the received side information. Moreover, the guide message displaying step S4310 outputs data for identifying a function in next order if the remote control signal is received.

The transmitting step S4360 may be designed to transmit the extracted remote control signal to the electronic device in direct or via the $2^{nd}$ remote controller.

Particularly, the graphic image including the data for identifying the $1^{st}$ function may include at least one of a $1^{st}$ tab for changing a location of the graphic image, a $2^{nd}$ tab for adjusting the number of options included in the graphic image, a $3^{rd}$ tab for switching an electronic device to control, and a $4^{th}$ tab for adding a function to control.

It will be appreciated by those skilled in the art that the present invention can be specified into other form(s) without departing from the spirit or scope of the inventions, which comes within the scope of the appended claims and their equivalents.

In addition, an electronic device operating method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents. Both apparatus and method inventions are mentioned in this specification and descriptions of both of the apparatus and method inventions may be complementarily applicable to each other.

What is claimed is:

1. A system that includes a television for controlling a set top box (STB), the television comprising:
   a memory;
   a display module;
   a user interface configured to receive at least one signal from a remote controller of the television; and
   a controller configured to control the STB as well as the television based on the received at least one signal via the user interface from the remote controller, wherein the controller is further configured to:
  enter into a universal remote controller setting mode,
  control the display module to display, in a first region of a screen, at least one button image, which is associated with at least one function of the STB,
  control the display module to display, in a second region of the screen, a guide message for guiding an input associated with the at least one button image, and
  control the display module to display, in a third region of the screen, a feedback screen,
  wherein the at least one button image in the first region, the guide message in the second region and the feedback screen in the third region are displayed together on the screen, and
  wherein first video data displayed in the feedback screen is changed into second video data when a channel change button image for testing among the at least one button image is selected by using the remote controller of the television during the universal remote controller setting mode, wherein a channel in which the first video data is transmitted is different from a channel in which the second video data is transmitted, and the first and second video data are received from the STB,
  wherein the remote controller comprises a RF module and an IR module, and at least one IR code value corresponding to the selected channel change button image is transmitted from the television to the RF module other than the IR module within the remote controller such that the at least one IR code value is carried on an RF signal, and then the at least one IR code value is transmitted via the IR module of the remote controller to the STB.

2. The system of claim 1, wherein the first video data displayed in the feedback screen is changed into the second video data such that it is able to provide a user with a possibility to test whether the STB can be controlled by the remote controller of the television.

3. The system of claim 1, wherein the memory is configured to store the at least one IR code value corresponding to at least one function of the STB.

4. The system of claim 3, further comprising:
  a network interface configured to access an external server and to receive the IR code value.

5. The system of claim 4, wherein the controller is further configured to update the memory based on the IR code value received via the network interface.

6. A method for processing data in a television for controlling a set top box (STB), the method comprising:
  receiving at least one signal from a remote controller of the television in an user interface;
  controlling the STB as well as the television based on the received at least one signal via the user interface from the remote controller;
  entering into a universal remote controller setting mode;
  displaying, in a first region of a screen, at least one button image, which is associated with at least one function of the STB;
  displaying, in a second region of the screen, a guide message for guiding an input associated with the at least one button image; and
  displaying, in a third region of the screen, a feedback screen,
  wherein the at least one button image in the first region, the guide message in the second region and the feedback screen in the third region are displayed together on the screen, and
  wherein first video data displayed in the feedback screen is changed into second video data when a channel change button image for testing among the at least one button image is selected by using the remote controller of the television during the universal remote controller setting mode, wherein a channel in which the first video data is transmitted is different from a channel in which the second video data is transmitted, and the first and second video data are received from the STB,
  wherein the remote controller comprises a RF module and an IR module, and at least one IR code value corresponding to the selected channel change button image is transmitted from the television to the RF module other than the IR module within the remote controller in a manner that the at least one IR code value is carried on an RF signal, and then the at least one IR code value is transmitted via the IR module other than the RF module within the remote controller to the STB.

7. The method of claim 6, wherein the first video data displayed in the feedback screen is changed into the second video data such that it is able to provide a user with a possibility to test whether the STB can be controlled by the remote controller of the television.

8. The method of claim 6, wherein the at least one IR code value corresponding to at least one function of the STB is stored in a memory.

9. The method of claim 8, further comprising:
  accessing an external server via a network interface; and
  receiving the at least one IR code value via the network interface.

10. The method of claim 9, further comprising:
  updating the memory based on the IR code value received via the network interface.

* * * * *